(12) United States Patent
Zhang et al.

(10) Patent No.: US 12,707,524 B2
(45) Date of Patent: Aug. 11, 2026

(54) BACK-OFF MECHANISMS FOR INTER-CELL MOBILITY

(71) Applicant: Apple Inc., Cupertino, CA (US)

(72) Inventors: Yushu Zhang, Beijing (CN); Chunhai Yao, Beijing (CN); Dawei Zhang, Saratoga, CA (US); Fangli Xu, Beijing (CN); Haitong Sun, Cupertino, CA (US); Jie Cui, San Jose, CA (US); Qiming Li, Beijing (CN); Wei Zeng, Saratoga, CA (US); Yuqin Chen, Beijing (CN)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/766,558

(22) PCT Filed: May 10, 2021

(86) PCT No.: PCT/CN2021/092754
§ 371 (c)(1),
(2) Date: Apr. 5, 2022

(87) PCT Pub. No.: WO2022/236573
PCT Pub. Date: Nov. 17, 2022

(65) Prior Publication Data
US 2024/0107610 A1 Mar. 28, 2024

(51) Int. Cl.
*H04W 76/20* (2018.01)
*H04L 1/1812* (2023.01)
(Continued)

(52) U.S. Cl.
CPC ........... *H04W 76/20* (2018.02); *H04L 1/1812* (2013.01); *H04L 5/0051* (2013.01);
(Continued)

(58) Field of Classification Search
CPC ... H04W 76/20; H04W 76/34; H04W 72/042; H04W 72/044; H04W 72/046;
(Continued)

(56) References Cited

U.S. PATENT DOCUMENTS

2019/0319833 A1* 10/2019 Nagaraja ................ H04L 5/001
2020/0374045 A1* 11/2020 Yin ..................... H04B 7/0456
(Continued)

FOREIGN PATENT DOCUMENTS

CN 111182590 A 5/2020
CN 112075099 A 12/2020
WO 2020031389 A1 2/2020

OTHER PUBLICATIONS

PCT Search Report dated Jan. 28, 2022 in connection with PCT Application No. PCT/CN2021/092754.
(Continued)

*Primary Examiner* — Moo Jeong
*Assistant Examiner* — Scott A Schlack
(74) *Attorney, Agent, or Firm* — Eschweiler & Potashnik, LLC; Matthew Glause

(57) ABSTRACT

Techniques discussed herein can facilitate back-off mechanisms for inter-cell mobility. One example aspect is a baseband processor configured to: receive a unified transmission configuration indicator (TCI) from a first serving cell where the unified TCI is associated with a second serving cell; in response to receiving the unified TCI, transmit an ACK message to the first serving cell; communicate with the second serving cell; configure a time window subsequent to transmission of the ACK message; and perform a fallback operation when a dedicated signaling from the second serving cell is not received within the time window.

20 Claims, 14 Drawing Sheets

(51) Int. Cl.
*H04L 5/00* (2006.01)
*H04W 36/00* (2009.01)
*H04W 72/1268* (2023.01)
*H04W 72/232* (2023.01)

(52) U.S. Cl.
CPC ....... *H04L 5/0053* (2013.01); *H04W 72/1268* (2013.01); *H04W 72/232* (2023.01)

(58) Field of Classification Search
CPC ........... H04W 72/085; H04W 72/1226; H04W 72/1231; H04W 72/1242; H04W 72/1263; H04W 72/1268; H04W 72/1273; H04W 72/1278; H04W 72/1289; H04W 72/23; H04W 72/232; H04W 24/08; H04W 24/10; H04W 80/02; H04W 80/08; H04W 16/28; H04L 1/0073; H04L 1/1812; H04L 1/1819; H04L 1/1864; H04L 1/1896; H04L 5/0035; H04L 5/0051; H04L 5/0053; H04L 5/0055; H04L 5/0092; H04B 7/0456; H04B 7/0623; H04B 7/0632; H04B 7/0695; H04B 7/088
See application file for complete search history.

(56) References Cited

U.S. PATENT DOCUMENTS

2021/0360594 A1* 11/2021 Park ..................... H04B 7/0408
2021/0392514 A1* 12/2021 Matsumura ....... H04W 72/1263
2021/0392527 A1* 12/2021 Taherzadeh Boroujeni ................ H04W 80/02
2022/0022215 A1* 1/2022 Gao ..................... H04B 7/0874
2022/0078670 A1* 3/2022 Kung .................. H04W 36/085
2022/0124782 A1* 4/2022 Park ...................... H04B 7/0404
2022/0225361 A1* 7/2022 Lee ................... H04W 72/1268
2023/0216565 A1* 7/2023 Kwak .................. H04B 7/0695 375/267

OTHER PUBLICATIONS

PCT Written Opinion dated Feb. 7, 2022 in connection with PCT Application No. PCT/CN2021/092754.

Moderator(Samsung): Moderator summary#2 for multi-beam enhancement: proposal categorization: 3GPP TSG RAN WG1 #102-e; R1-2007189; Aug. 28, 2020 (Aug. 28, 2020).

3rd Generation Partnership Project; Technical Specification Group Radio Access Network; NR; Radio Resource Control (RRC) protocol specification (Release 16); 3GPP TS 38.331 V16.4.1; Mar. 2021.

3rd Generation Partnership Project; Technical Specification Group Radio Access Network; NR; Physical layer procedures for control; (Release 16); 3GPP TS 38.213 V16.5.0 (Mar. 2021); http://www.3gpp.org.

3rd Generation Partnership Project; Technical Specification Group Radio Access Network; NR; Physical layer procedures for data; (Release 16); 3GPP TS 38.214 V16.5.0 (Mar. 2021); http://www.3gpp.org.

3rd Generation Partnership Project; Technical Specification Group Radio Access Network; NR; Medium Access Control (MAC) protocol specification; (Release 16); 3GPP TS 38.321 V16.4.0 (Mar. 2021); http://www.3gpp.org.

International Preliminary Report on Patentability dated Nov. 23, 2023 in connection with Application Serial No. PCT/CN2021/092754.

* cited by examiner

BACK-OFF MECHANISMS FOR INTER-CELL MOBILITY

REFERENCE TO RELATED APPLICATIONS

This application is a National Phase entry application of International Patent Application No. PCT/CN2021/092754 filed May 10, 2021, entitled "BACK-OFF MECHANISMS FOR INTER-CELL MOBILITY", the contents of which are herein incorporated by reference in their entirety.

FIELD

The present disclosure relates to wireless technology including Layer 1/Layer 2 (L1/L2)-centric inter-cell mobility in new radio (NR) communications.

BACKGROUND

Mobile communication in the next generation wireless communication system, 5G, or new radio (NR) network will provide ubiquitous connectivity and access to information, as well as the ability to share data, around the globe. 5G networks and network slicing will be a unified, service-based framework, that will target to meet versatile, and sometimes conflicting, performance criteria. 5G networks will provide services to vastly heterogeneous application domains ranging from Enhanced Mobile Broadband (eMBB) to massive Machine-Type Communications (mMTC), Ultra-Reliable Low-Latency Communications (URLLC), and other communications. In general, NR will evolve based on third generation partnership project (3GPP) long term evolution (LTE)-Advanced technology with additional enhanced radio access technologies (RATs) to enable seamless and faster wireless connectivity solutions.

DETAILED DESCRIPTION

Figure 1:
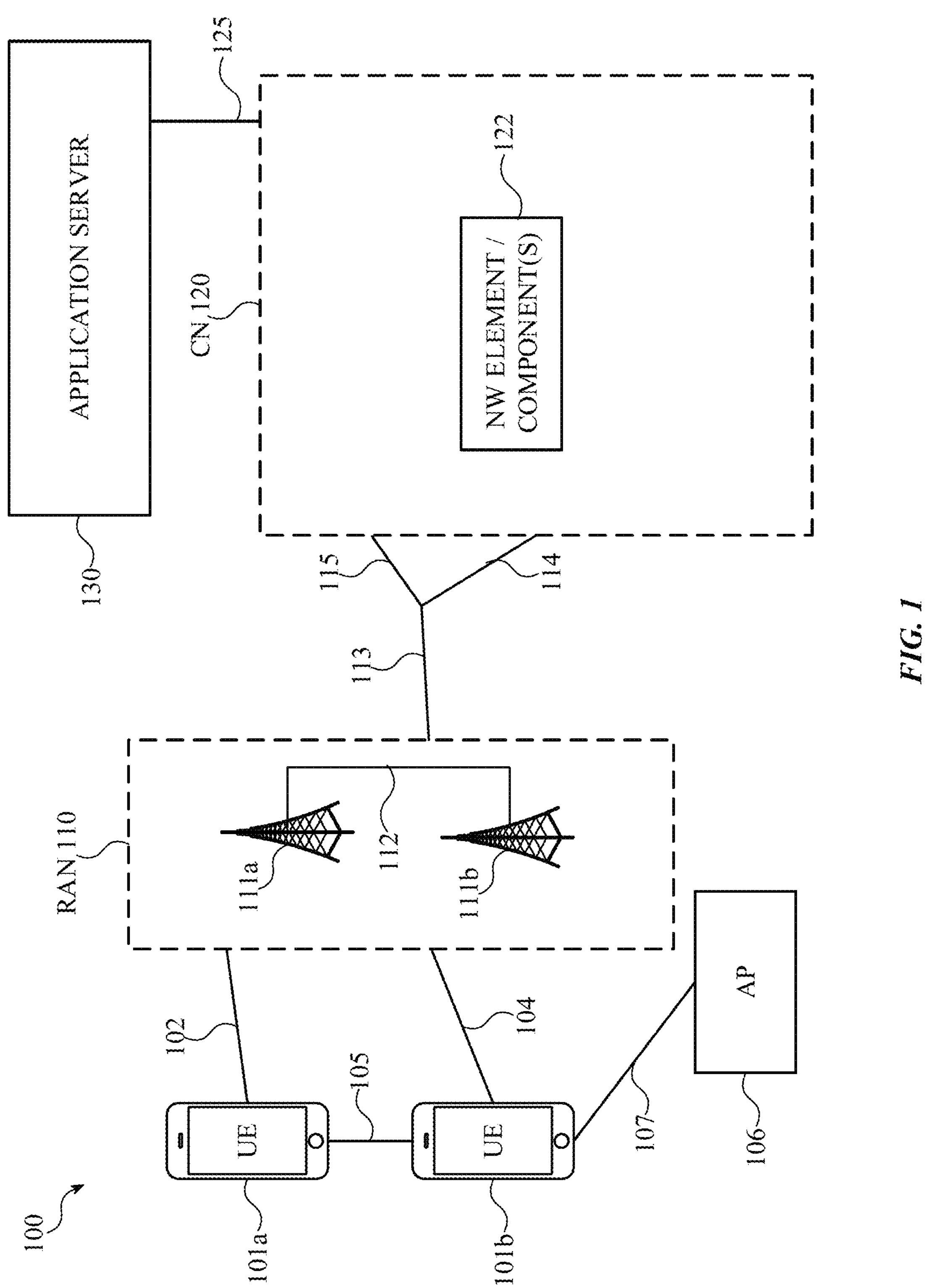
FIG. 1 is an exemplary block diagram illustrating an example of user equipment(s) (UEs) communicatively coupled to a network in accordance with various aspects described herein.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Load balancing is achieved in new radio (NR) 5G networks with handover operations, redirection mechanisms upon radio resource control (RRC) signaling release and through the usage of inter-frequency and inter-radio access technology (RAT) priorities and offset parameters. Legacy layer 3 (L3) handover mechanisms have difficulty achieving this purpose for a few different reasons. For example, the L3 handovers have a long handover latency, a long interruption time during the handover, and a heavy signaling overhead is induced. However, L3 signaling such as RRC signaling at the network layer includes a long handover latency, a long interruption time during the handover, and a heavy signaling overhead. Thus, L3 handover mechanisms do not always satisfy the objectives for fast cell change with high frequencies in 5G networks.

Described herein are techniques for enhancement of signaling mechanisms for handover to improve handover latency and efficiency by increasing the usage of dynamic control signaling (as opposed to RRC signaling). In various aspects, mechanisms for a layer 1 (L1)/layer 2 (L2)-centric inter-cell mobility in a handover operation are proposed. An objective of L1/L2-centric inter-cell mobility is a fast cell change with high frequency.

In aspects, a lower latency and lower overhead handover can be configured in next generation (NR) networks or 5G core networks by supporting L1/L2-centric inter-cell handovers. This can enable multiple cell candidate configurations and transmission control indication states to be stored and dynamically utilized autonomously by a user equipment (UE) device for handover, while lowering latency and signaling load.

The network (e.g., a base station, evolved NodeB (eNB), next generation NodeB (gNB), cell, or other network component) can configure a unified transmission configuration indicator (TCI) where the TCI indicates a second serving cell for a UE that is presently communicating with a first serving cell. The UE can receive the unified TCI from the first serving cell and apply the second serving cell configuration information at a later time in response to either a predefined condition or a network indication. The UE may transmit an acknowledgment (ACK) or a negative acknowledgment (NACK)/discontinuous transmission (DTX) to the first serving cell in response to receiving the unified TCI. The first serving cell and the second serving cell can be configured with a different physical cell ID. As such, the first and second serving cells can be physical cells or component carriers.

In some situations, the network may erroneously interpret the ACK as a NACK/DTX or the network can erroneously interpret the NACK/DTX as an ACK. When the ACK is erroneously interpreted as a NACK/DTX, the UE may switch to the second serving cell while the network tries to communicate with the UE from the first serving cell. When the NACK/DTX is erroneously interpreted as an ACK, the UE may maintain communication with the first serving cell while the network tries to communicate with the UE from the second serving cell. As such, a serving cell mismatch can occur when the network erroneously misinterprets the ACK or NACK/DTX sent by the UE.

Various aspects of the present disclosure are directed towards a back-off mechanism for inter-cell mobility. Mechanisms to recover from serving cell mismatch as well as additional signaling to avoid serving cell mismatch are presented.

In some aspects, the UE can take steps to recover from an ACK being interpreted by the network as a NACK/DTX. For example, the UE can receive a unified transmission configuration indicator (TCI) from a first serving cell wherein the unified TCI is associated with a second serving cell. In response to receiving the unified TCI, the UE transmits an ACK message to the first serving cell and communicates with the second serving cell. The UE configures a time window subsequent to transmission of the ACK message; and performs a fallback operation when a dedicated signaling from the second serving cell is not received within the time window.

Example fallback operations include the UE switching communication from the second serving cell to the first serving cell, the UE transmitting a contention based random access channel preamble (PRACH) to the second serving cell, the UE transmitting a contention free PRACH to the second serving cell, or the UE transmitting a scheduling request (SR) to the second serving cell.

In some aspects, the UE can take steps to recover from a NACK/DTX being interpreted by the NW as an ACK. In response to transmitting a NACK/DTX, the UE can maintain connection with the first serving cell and configure a time window. The UE can perform a fallback operation when dedicated signaling from the first BS is not received within the time window. Example fallback operations include the UE transmitting a contention based PRACH to the first serving cell or transmitting a contention based PRACH to the second serving cell.

In some aspects, the UE can engage in additional signaling to avoid a serving cell mismatch. In response to transmitting an ACK, the UE can transmit an uplink signal to the second serving cell prior to switching to the second serving cell. The second cell can transmit a downlink confirmation and the UE can switch communication from the first serving cell to the second serving cell in response to receiving the downlink confirmation. In other aspects, after transmitting an ACK or NACK/DATX, the UE can configure communication with both the first serving cell and the second serving cell according to a multi downlink control information (multi-DCI) based inter-cell multi transmission reception point (multi-TRP) operation. As such, the UE can maintain communication with both the first serving cell and the second serving cell until a condition is satisfied. The UE may then switch to communication with either the first serving cell or the second serving cell so as to avoid a serving cell mismatch.

Additional aspects and details of the disclosure are further described below with reference to figures.

FIG. 1 illustrates example architecture of a system 100 of a network that includes UE 101*a* and UE 101*b* (collectively referred to as "UEs 101" or "UE 101"), a radio access network (RAN) 110, and a CN 120. The UEs communicate with the CN 120 by way of the RAN 110. In aspects, the RAN 110 can be a next generation (NG) RAN or a 5G RAN, an evolved-UMTS Terrestrial RAN (E-UTRAN), or a legacy RAN, such as a UTRAN or GERAN. As used herein, the term "NG RAN" or the like can refer to a RAN 110 that operates in an NR or 5G system 100, and the term "E-UTRAN" or the like can refer to a RAN 110 that operates in an LTE or 4G system 100. The UEs 101 utilize connections (or channels) 102 and 104, respectively, each of which comprises a physical communication interface/layer.

Alternatively, or additionally, each of the UEs 101 can be configured with dual connectivity (DC) as a multi-RAT or multi-Radio Dual Connectivity (MR-DC), where a multiple Rx/Tx capable UE may be configured to utilize resources provided by two different nodes (e.g., 111*a*, 111*b*, or other network nodes) that can be connected via non-ideal backhaul, one providing NR access and the other one providing either E-UTRA for LTE or NR access for 5G, for example.

In MR-DC, a group of serving cells associated with a master Node can be configured as a master cell group (MCG), comprising of a special cell (SpCell) as a primary cell (PCell) and optionally one or more secondary cells (SCells). A MCG can be the radio access node that provides the control plane connection to the CN 120; it may be a Master eNB (in EN-DC), a Master ng-eNB (in NGEN-DC) or a Master gNB (in NR-DC and NE-DC), for example. SpCell can either refer to the PCell of the MCG or the PSCell of a second cell group (SCG) depending on if the MAC entity that is associated to the MCG or the SCG, respectively. An SpCell can refer to a PCell of MCG or an SCG. A SCG in MR-DC can be a group of serving cells associated with an SN, comprising of the SpCell as a primary secondary cell (PSCell) and optionally one or more SCells.

In this example, the connections 102 and 104 are illustrated as an air interface to enable communicative coupling. In aspects, the UEs 101 can directly exchange communication data via a ProSe interface 105. The ProSe interface 105 can alternatively be referred to as a SL interface 105 and can comprise one or more logical channels.

The RAN 110 can include one or more access nodes or RAN nodes 111*a* and 111*b* (collectively referred to as "RAN nodes 111" or "RAN node 111") that enable the connections 102 and 104. As used herein, the terms "access node," "access point," or the like can describe equipment that provides the radio baseband functions for data and/or voice connectivity between a network and one or more users. These access nodes can be referred to as BS, gNBs, RAN nodes, eNBs, NodeBs, RSUs, Transmission Reception Points (TRxPs) or TRPs, and so forth.

In aspects where the system 100 is a 5G or NR system, the interface 112 can be an Xn interface 112. The Xn interface is defined between two or more RAN nodes 111 (e.g., two or more gNBs and the like) that connect to 5GC 120, between a RAN node 111 (e.g., a gNB) connecting to 5GC 120 and an eNB, and/or between two eNBs connecting to 5GC 120.

The RAN 110 is shown to be communicatively coupled to a core network—in this aspect, core network (CN) 120. The CN 120 can comprise a plurality of network elements 122, which are configured to offer various data and telecommunication services to customers/subscribers (e.g., users of UEs 101) who are connected to the CN 120 via the RAN 110.

Cell Mismatch Back-Off Mechanisms

Figure 2:
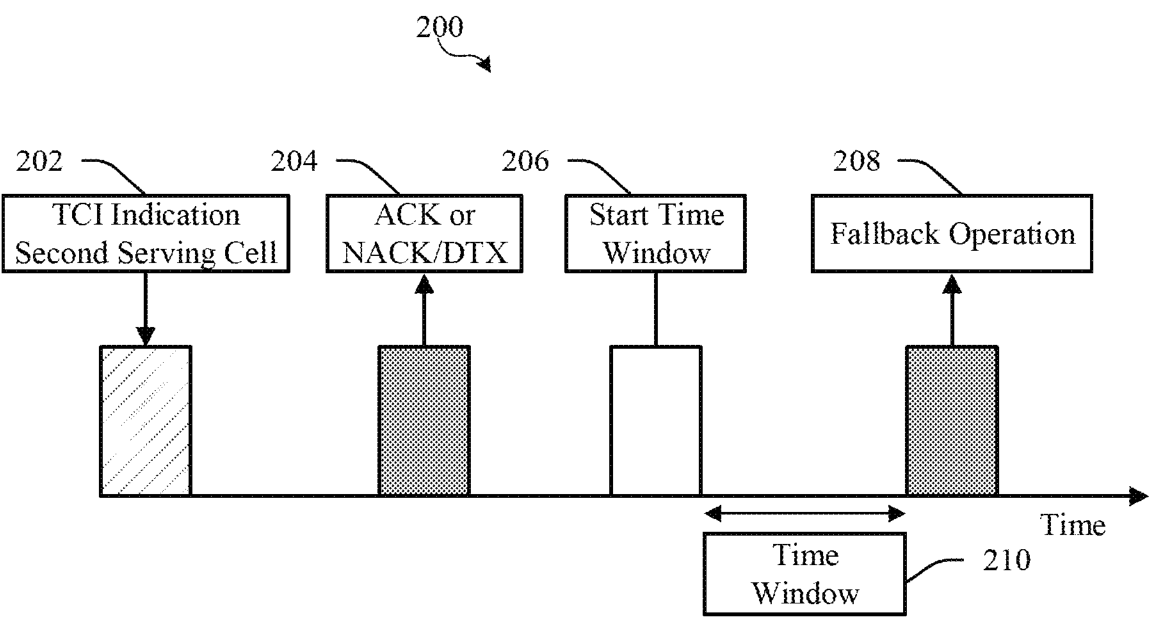
FIG. 2 illustrates a timing diagram of an example layer 1 (L1)/layer 2 (L2)-centric inter-cell mobility operation that includes a back-off mechanism, in accordance with various aspects disclosed.

FIG. 2 illustrates a timing diagram of a layer 1 (L1)/layer 2 (L2)-centric inter-cell mobility operation that includes a back-off mechanism. The timing diagram of the signal flow diagram 400 generally outlines back-off mechanism that will be further described below. At 202 a UE (e.g. UE 101), receives a unified transmission configuration indicator (TCI) from a first serving cell. The unified TCI includes beam information regarding a non-serving cell (hereinafter second serving cell) that can become a future serving cell for the UE. The first serving cell may, for example, include a first base station (BS) (e.g., BS 111*a* of FIG. 1) and the second serving cell may, for example, include a second BS (e.g., BS 111*b* of FIG. 1). Herein and throughout, a serving cell or BS can be a physical cell or component carriers. As such, the first serving cell and the second serving cell can be configured with a different physical cell ID. After receiving the unified TCI, at 204 the UE transmits an acknowledgment (ACK) or a negative acknowledgment (NACK)/discontinuous transmission (DTX) message to the first serving cell and at 206 starts a time window 210. The UE can engage in further signaling, processing, and configuring after starting the time window 210. When a dedicated signaling or response message is not received by the UE from the first serving cell or the second serving cell within the time window 210, the UE determines that a serving cell mismatch has occurred and at 208 the UE performs a fallback operation.

Figure 3:
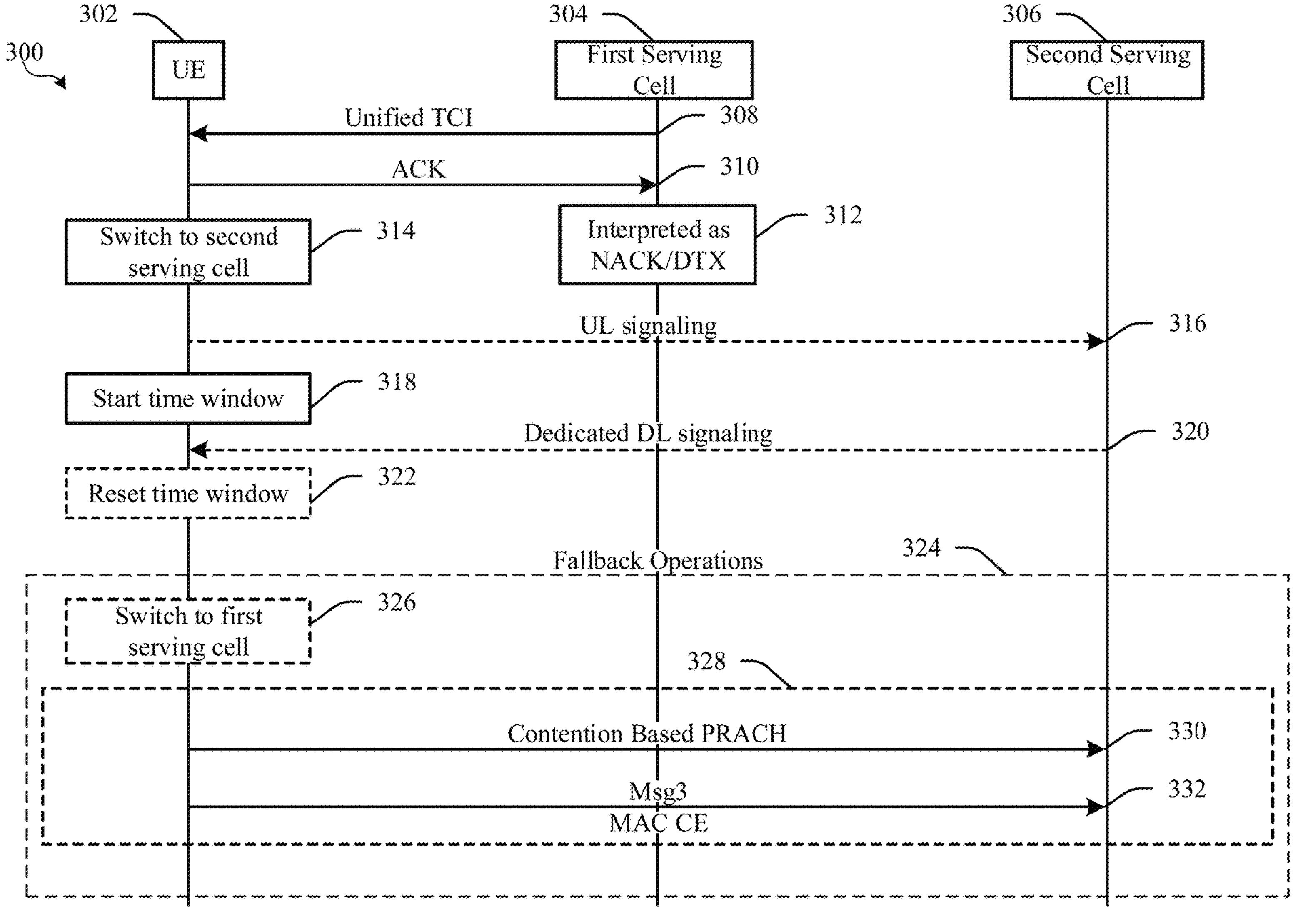
FIG. 3 is a signal flow diagram outlining an example fallback operation that may occur when a UE transmits an acknowledgment (ACK) associated with a unified transmission configuration indicator (TCI) that is erroneously interpreted as a negative acknowledgment (NACK)/discontinuous transmission (DTX) by a first serving cell, in accordance with various aspects disclosed.

FIG. 3 is a signal flow diagram 300 outlining an example fallback operation that may occur when a UE transmits an ACK associated with a unified TCI that is erroneously interpreted as a NACK/DTX by a first serving cell.

The signaling of FIG. 3 occurs in L1/L2/L3 between a UE 302, a first serving cell 304, and a second serving cell 306. The UE 302 can be, for example, UE 101 of FIG. 1. The first serving cell 504 and the second serving cell 506 can, for example, include a base station (BS) such as BS 111*a*, BS 111*b* of FIG. 1. The UE 302 has established a connection with the first serving cell 304 in a L1/L2-centric inter-cell mobility configuration. At 308, the first serving cell 304 transmits a unified TCI to the UE 302.

The unified TCI includes a mapping between a TCI state and the second serving cell 306 for the UE 302. In an aspect, the configuration of each candidate cell includes an L1/L2/L3 configuration for the candidate cell or one or more restriction(s) on a L1/L2 based cell change mobility. For example, the candidate cell configuration may indicate whether the L1 configuration or the L1 and L2 configuration are to be provided to perform a cell change or handover operation.

The unified TCI can further include quasi-located (QCLed) information, including beam related information, associated with a group of candidate cells including the second serving cell 306, for the UE 302. For example, the unified TCI can contain information relating the UE 302 and the second serving cell 306 including one or more of a demodulation reference signal (DM-RS) resource, a phase tracking reference signal (PT-RS), a channel state information reference signal (CSI-RS) resource, a synchronization signal block (SSB) information, or the like. As such, in some aspects, the unified TCI is associated with the second serving cell 306. The UE 302 can use the information from the unified TCI to conduct operations including performing a cell handover, switching to, or communicating with the second serving cell 306, or configuration thereof to handover, switch, communicate, etc. . . . .

The first serving cell 304 can provide the UE 302 with a medium access control element (MAC CE) or downlink control information (DCI) indicating the unified TCI. Furthermore, the MAC CE or DCI can include instructions that cause the UE 302 to schedule switching communication to the second serving cell 306.

Aspects of the first serving cell 304 transmitting the unified TCI to the UE 302 relate to the UE receiving a unified TCI from the first serving cell at 202 of FIG. 2.

In response to receiving the unified TCI, at 310 the UE 302 transmits an ACK message to the first serving cell 304. The ACK message corresponds to the MAC CE or DCI received from the first serving cell 304 at 308 and serves as an acknowledgment of receiving the unified TCI. In some aspects, the ACK message indicates to the first serving cell 304 that the UE 302 will hand over from the first serving cell 304 to the second serving cell 306. In other aspects the ACK message indicates to the first serving cell 304 that the UE 302 will switch communication to the second serving cell 306 or configure operation to communicate with the second serving cell 306.

In an aspect, the UE 302 can send the ACK via an L1 message, an L2 message or an L3 message signaling. L1 signaling comprises a scheduling request (SR) transmission or a particular physical uplink control channel (PUCCH) transmission. L2 signaling can be a MAC CE (e.g., any UL MAC CE or a different or new dedicated MAC CE designated for L1/L2-centric inter-cell mobility). The L3 signaling can be an RRCReconfigurationComplete message, or a different RRC message. Additionally, or alternatively, the UE 302 can deliver the ACK message via a scheduling request (SR) transmission. As such, the UE 302 can deliver the ACK message with SR according to the network indicated TCI state, which is used to request an uplink (UL) grant for data transmission.

Aspects of the UE 302 transmitting an ACK message to the first serving cell 304 at 310 relate to the UE transmitting an ACK or NACK/DTX message to the first serving cell at 204 of FIG. 2.

The first serving cell 304 erroneously interprets the ACK message as a NACK/DTX message at 312. As such, the network will communicate with the UE 302 from the first serving cell 304 while the UE 302 attempts to communicate with the network according to the second serving cell 306.

This misinterpretation of the ACK may be caused by a failure of an error correcting procedure employed by the first serving cell 304; a modulation scheme error or coding scheme error on behalf of the UE 302 when generating the ACK for transmission; destructive interference of the uplink ACK message signal with another nearby signal; or the like. The UE 302 may not be aware that the network interpreted the ACK message as a NACK/DTX message and may proceed to switching communication to the second serving cell 306 according to the unified TCI.

At 314, the UE 302 switches communication to the second serving cell 306. In some aspects, switching communication to the second serving cell 506 includes one or more of a handover to the second serving cell 306, configuring UE 302 resources to communicate with the second serving cell 306, detecting and communicating with a beam of the second serving cell 306, or canceling communication with the first serving cell 304. In some aspects, switching to the second serving cell initiates UL signaling to the second serving cell 306 at 316. UL signaling can include a sounding reference signal (SRS) that provides the second serving cell 306 with channel quality information of the UE 302. In some aspects the UE 302 switches communication to the second serving cell 306 in response to transmitting the ACK message at 310. In other aspects the UE 302 switches communication to the second serving cell 306 in response to receiving the unified TCI at 308.

The UE 302 uses information contained in the unified TCI to switch communication to the second serving cell 306. For example, the unified TCI can include QCLed CSI-RS resource beam information associated with the second serving cell 306. The UE 302 can use the QCLed CSI-RS resource beam information associated with the second serving cell 306 to switch communication to a beam of the second serving cell 306. The UE 302 use of the unified TCI is not limited in this regard and the UE 302 can use any mapping data between the TCI state and the candidate cell, any other unified TCI information previously described herein, or as is commonly known in the art. Furthermore, the received MAC CE or DCI signaling indicating the unified TCI can include instructions that cause the UE 302 to switch communication to the second serving cell 306 at 314.

At 318, the UE 302 configures and starts a time window after transmitting the ACK message. In some aspects, the duration of the time window can be configured by the first serving cell 304 through RRC signaling with the UE 302 while the UE 302 is in a connected state with the first serving cell 304. In other aspects, the UE 302 autonomously configures the time window. The time window can start after the first symbol of the ACK message is transmitted or after the last symbol of the ACK message is transmitted. Alternatively, the time window may start after an action time associated with the unified TCI downlink signaling at 308. For example, an action timer may be configured by the UE 302 upon reception of the unified TCI, and the time window is started at 318 when the action timer expires.

Aspects of actions at 310, 312, 314, 316, and 318 of FIG. 3 correspond to the UE transmitting the ACK or NACK/DTX message at 204 of FIG. 2 through starting the time window at 210 of FIG. 2.

If the ACK from the UE 302 had been properly interpreted by the first serving cell 304, the network would instruct the second serving cell 306 to communicate with the UE 302 according to the unified TCI information. In response, the second serving cell 306 would transmit a dedicated downlink (DL) signaling to the UE 302 at 320. For example, the second serving cell 306 may transmit a physical downlink control channel (PDCCH) dedicated DL signal. The UE 302 would interpret the receiving of dedicated DL signaling as an indication that switching to the second serving cell was successful and would cancel the time window and continue communication with the second serving cell 506.

When, as illustrated in FIG. 3, the UE 302 does not receive dedicated DL signaling from the second serving cell during the time window, the UE 302 will perform a fallback operation indicated generally as 324 to re-establish communication with the network. Several example fallback operations are disclosed herein. While fallback operations can be performed independently, multiple fallback operations may be performed sequentially or concurrently. The fallback operations discussed herein relate to the UE performing the fallback operation at 208 of FIG. 2.

In one example, when the UE 302 receives dedicated DL signaling from the second serving cell 306 the UE 302 resets the time window at 322. In this example, the UE 302 may perform the fallback operation any time dedicated signaling is not received from the second serving cell within the time window of the last received dedicated signaling.

One example fallback operation includes switching communication back to the first serving cell as indicated by 326. Switching communication to the first serving cell 304 may include configuring resources to communicate with the first serving cell 304, performing a beam re-selection procedure associated with the first serving cell, configuring prior beam information of the first serving, or transmitting UL signaling to the first serving cell 304. In some aspects, the UE 302 retains beam information regarding the first serving cell 304 when the UE 302 switches communication to the second serving cell 306 at 314. When the UE 302 performs the fallback operation, the UE 302 can re-configure using the retained beam information regarding the first serving cell 304, and communicate with the first serving cell according to the retained beam information. When the network erroneously interprets the ACK message at 310 as a NACK/DTX message, the network may expect communication from the UE 302 by way of the first serving cell 304. Thus, when the UE 302 switches back to the first serving cell at 526, the UE 302 quickly recovers communication with the network.

A second example fallback operation 328 includes the UE 302 transmitting a signal to the second serving cell 306 if no dedicated signaling is received during the time window. For example, the UE 302 may transmit a contention based random access channel preamble (PRACH) to the second serving cell 306 at 330. The UE 302 can transmit the contention based PRACH according to the configuration information indicated in the unified TCI associated with the second serving cell 306. In some aspects, the UE 302 transmits the contention based PRACH according to a beam of the second serving cell 306 as indicated by the unified TCI. In other aspects, the UE 302 transmits the contention based PRACH without using configuration information from the unified TCI.

In some aspects the UE 302 transmits the PRACH according to a 4-step RACH process. In response to the contention based PRACH, the second serving cell 306 can respond with a RACH Msg2 including an UL grant associated with a RACH Msg3. Subsequently, at 332, the UE 302 can transmit the RACH Msg3 according to the UL grant. To resolve the serving cell mismatch, the UE 302 can configure the RACH Msg3 with a MAC CE associated with a L1/L2-centric inter-cell mobility failure. As such, the network identifies the serving cell mismatch upon reception of the MAC CE associated with a L1/L2-centric inter-cell mobility failure.

In other aspects the UE 302 transmits the contention based PRACH according to a 2-step RACH process. As such, the UE 302 transmits the MAC CE associated with a L1/L2-centric inter-cell mobility failure with the PRACH in a RACH MsgA at 330 with the contention based PRACH. By using the contention based PRACH process, the UE 302 can establish communication with the second serving cell 306. In this manner, the UE 302 quickly recovers communication with the network and maintains L1/L2-centric inter-cell communication with the network.

Figure 4:
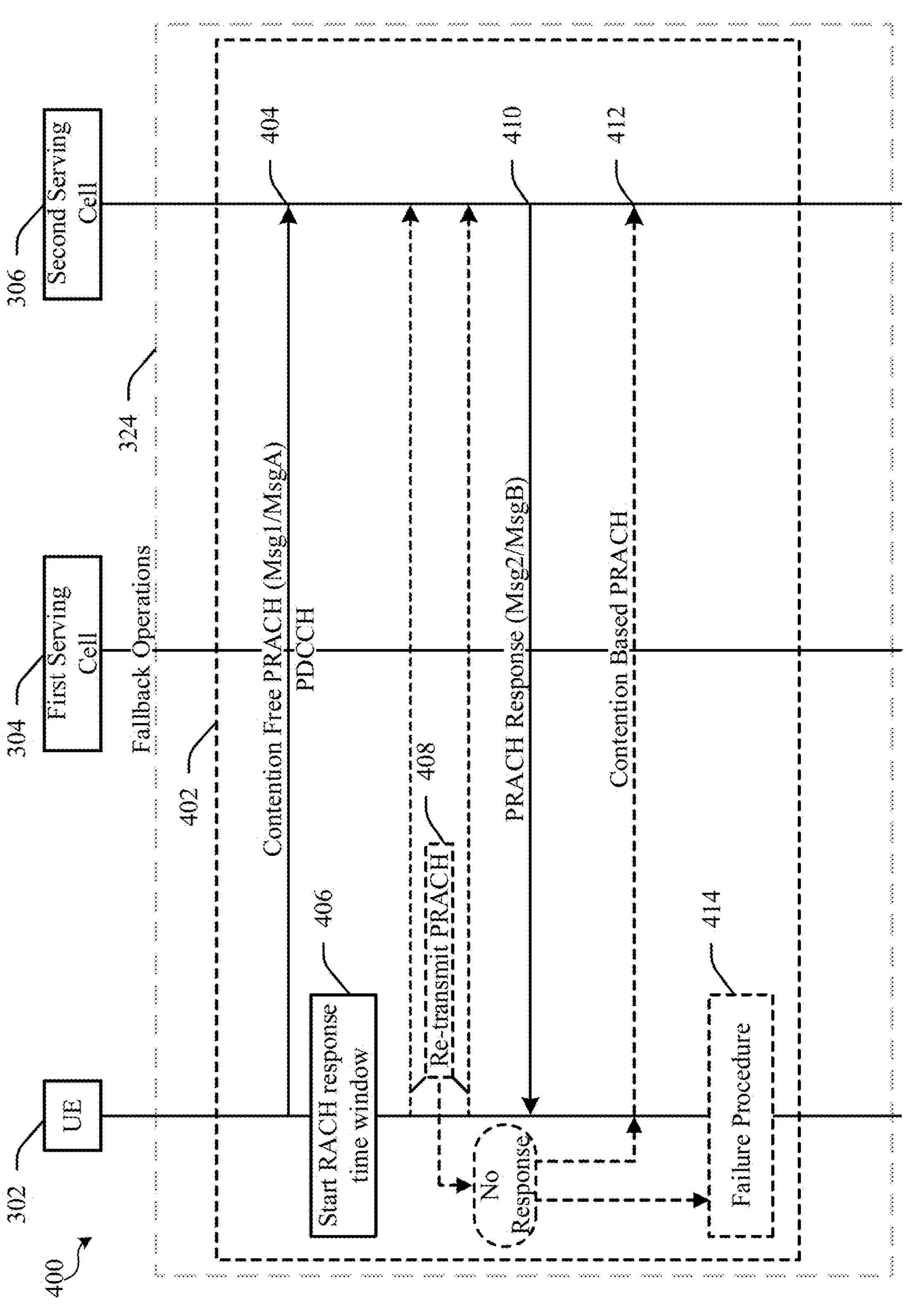
FIG. 4 is a signal flow diagram for an example contention based random access channel (RACH) fallback operation associated with the back-off mechanism of FIG. 3, in accordance with various aspects disclosed.

FIG. 4 is a signal flow diagram 400 for an example contention based random access channel fallback operation associated with the back-off mechanism of FIG. 3. The signal flow diagram 400 describes additional or alternative operations of the fallback operation at 324 and is preceded by acts 308-322 of FIG. 3.

The signal flow diagram 400 illustrates a fallback mechanism 402 in which the UE 302 transmits a contention free PRACH to the second serving cell 306 at 404. A preamble associated with the contention free PRACH is configured through RRC signaling by the first serving cell 304 at an earlier time. The contention free PRACH resource can be a dedicated resource associated with a L1/L2-centric inter-cell mobility failure. As such, the network can identify a serving cell mismatch upon reception of the contention free PRACH associated with a L1/L2-centric inter-cell mobility failure. The contention free PRACH can be transmitted in a RACH Msg1 for a 4-step RACH process or a RACH MsgA for a 2-step RACH process.

After transmitting the contention free PRACH, the UE 302 starts a RACH response time window at 406 by which the UE 302 expects to receive a PRACH response (also referred to as a response message in some aspects) from the second serving cell 306. When the UE 302 does not receive the PRACH response during the RACH response time window, the UE 302 can re-transmit the contention free PRACH at 408. In some aspects the UE 302 re-transmits the contention free PRACH a number of times. In other aspects, the UE 302 restarts the RACH response time window after re-transmitting the contention free PRACH, and re-transmits the contention free PRACH again if the PRACH response is not received during the restarted RACH response time window. A maximum number of re-transmissions of the contention free PRACH and a duration of the time window can be configured by RRC signaling of the first serving cell 304, can be pre-defined, or can be autonomously configured by the UE 302.

At 410, the second serving cell 306 transmits the PRACH response in response to the receiving contention free PRACH. The PRACH response can be a 4-step RACH Msg2 response, a 2-step RACH MsgB response, or a response sent with the Msg2/MsgB response. The PRACH response can be transmitted during the RACH response time window or in response to a re-transmission of the contention free PRACH. The UE 302 can receive the PRACH response message in at least one of a dedicated search space or a control resource set. The at least one of a dedicated search space or a control resource set can be configured by RRC signaling associated with the first serving cell 304, or configured by a physical downlink control channel (PDCCH) associated with the second serving cell 306 where the PDCCH is based on a radio network temporary identifier (RNTI) of the UE 302. Furthermore, the RNTI can be configured by RRC associated with the first serving cell 304 or predefined. The PDCCH can be a designated PDCCH for a PRACH associated with the L1/L2-centric inter-cell mobility failure.

When the PRACH response is not received by the UE 302 during the RACH response time window, or after an associated time when the UE 302 re-transmits the contention free PRACH, the UE 302 may perform a no response action. In an aspect, the no response action can include transmitting a contention based PRACH to the second serving cell at 412. Transmitting the contention based PRACH can include aspects related to the second example fallback operation 328 of FIG. 3. In another aspect, the no response action can include performing one or more of a radio link failure procedure, a beam failure recovery procedure, or a candidate beam detection procedure at 414. As a result of the fallback operation mechanism 402, the UE 302 resolves the serving cell mismatch through the contention free, contention based, radio link failure, beam failure recovery, or candidate beam detection procedure.

Figure 5:
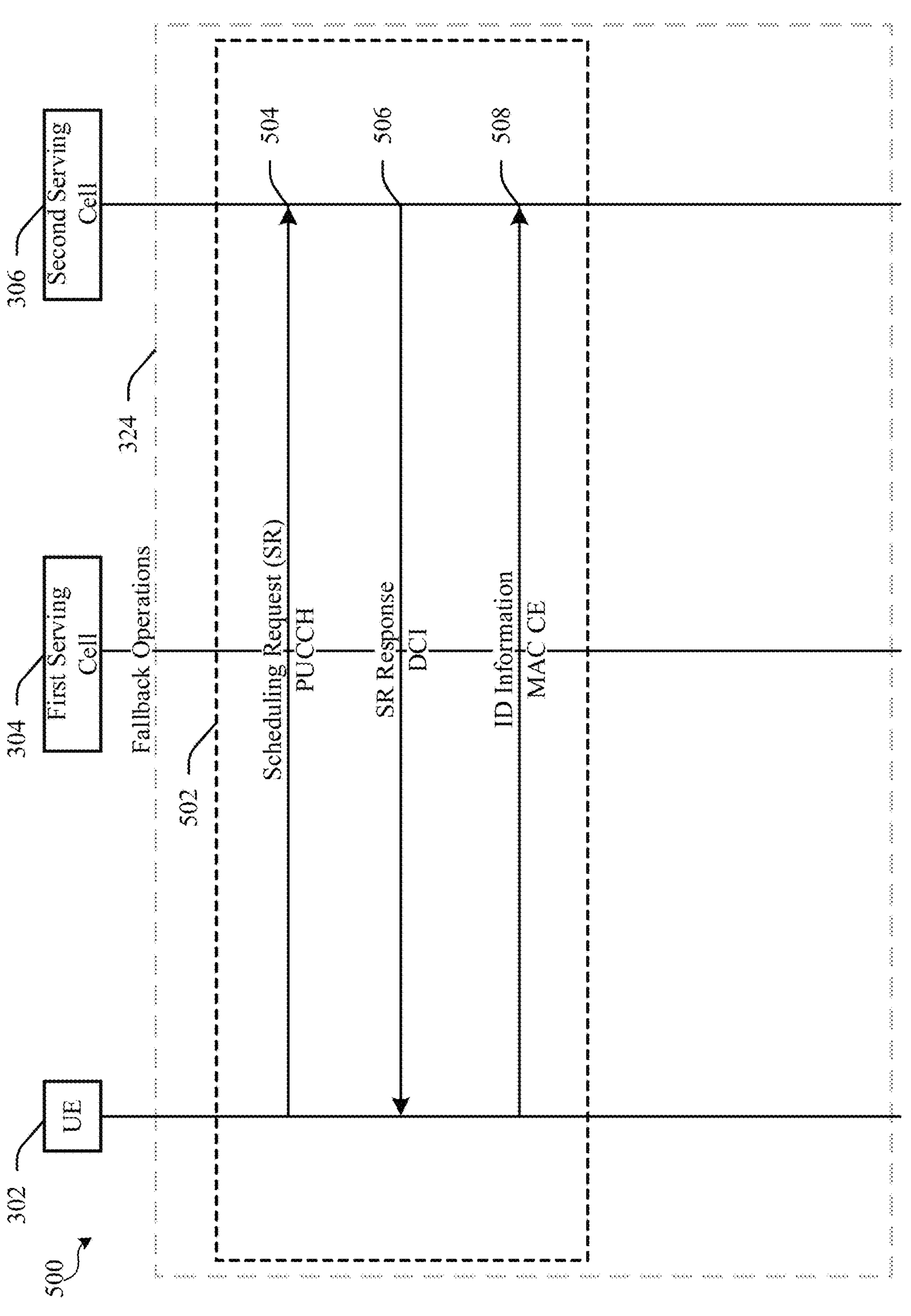
FIG. 5 is a signal flow diagram for an example scheduling request (SR) based fallback operation associated with the back-off mechanism of FIG. 3, in accordance with various aspects disclosed.

FIG. 5 is a signal flow diagram 500 for an example scheduling request (SR) based fallback operation associated with the back-off mechanism. The signal flow diagram 500 describes additional or alternative operations of the fallback operation at 324 and the signal flow diagram 500 is preceded by acts 308-322 of FIG. 3.

The flow diagram of the signal flow diagram 500 illustrates a fourth example fallback operation 502, in which the UE 302 transmits a scheduling request (SR) to the second serving cell 306 at 504. The SR can be based on a physical uplink control channel (PUCCH) resource configured by RRC signaling associated with the first serving cell 304. The second serving cell 306 can respond to the SR with a SR response at 506. The SR response can include an UL grant for the UE 302. The SR response can be a DCI based on a cell radio network temporary identifier (C-RNTI) associated with the UE 302. The C-RNTI can be a C-RNTI associated with the UE 302 and the second serving cell 306. Alternatively, the DCI can be based on a radio network temporary identifier (RNTI) associated with a group of UEs where the group of UEs includes the UE 302.

The UE 302 can indicate the serving cell mismatch to the network by sending ID information to the second serving cell 306 at 508. At 508 ID information is transmitted by the UE 302 with a MAC CE according to the UL grant. The MAC CE can be associated with a L1/L2-centric inter-cell mobility failure, and indicates to the serving cell mismatch to the network. The ID information in the MAC CE can include one or more of a C-RNTI associated with the first serving cell, a C-RNTI associated the second serving cell, or a physical cell ID (PCI) associated with the first serving cell. As such, the network is notified of the serving cell mismatch, is provided with associated cell IDs of the devices involved in the cell mismatch, and the network can appropriately adjust L1/L2-centric inter-cell communication with the UE 302 through the second serving cell 306.

Figure 6:
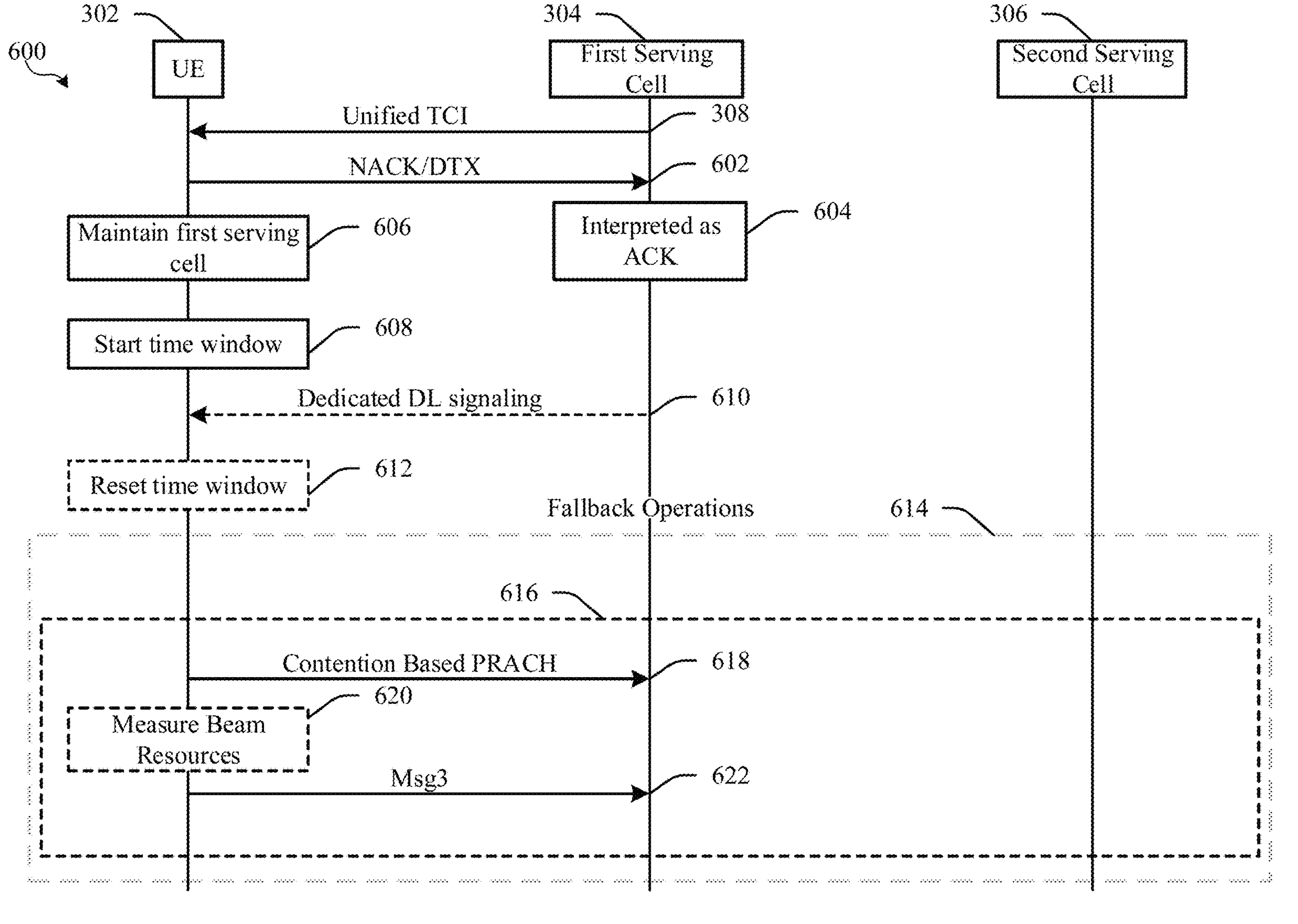
FIG. 6 is a signal flow diagram for an example back-off mechanism for a L1/L2-centric inter-cell mobility operation when a UE transmits a NACK/DTX associated with a unified TCI, in accordance with various aspects disclosed.

FIG. 6 is a signal flow diagram 600 for an example back-off mechanism for a L1/L2-centric inter-cell mobility operation when a UE transmits a NACK/DTX associated with a unified TCI that is erroneously interpreted as an ACK. If a NACK/DTX from the UE 302 was properly interpreted by the first serving cell 304, the network would instruct the first serving cell 304 to continue to communicate with the UE 302. In response, the first serving cell 304 would transmit a dedicated DL signaling to the UE 302 at 610. For example, the first serving cell 304 may transmit a PDCCH dedicated DL signal. The UE 302 would interpret the receiving of dedicated DL signaling as an indication that the NACK/DTX was successful and may cancel the time window and continue communication with the first serving cell 304. The dedicated DL signaling may occur as a result of the network properly interpreting the NACK/DTX message at 602 and the network instructing the first serving cell 304 to communicate with the UE 302.

At 308, the first serving cell 304 transmits a unified TCI to the UE 302 and includes the same aspects discussed in FIG. 3 regarding act 308. In response to receiving the unified TCI, at 602 the UE 302 transmits a NACK/DTX message to the first serving cell 304. The NACK/DTX message corresponds to the MAC CE or DCI received from the first serving cell 304 at 308 and serves as a negative acknowledgment with regards to switching to the second serving cell 306 indicated by the unified TCI. In some aspects, the NACK/DTX message indicates to the first serving cell 304 that the UE 302 will maintain communication with the first serving cell 304.

In an aspect, the UE 302 can send the ACK via an L1 message, an L2 message or an L3 message signaling. L1 signaling comprises a scheduling request (SR) transmission or a particular physical uplink control channel (PUCCH) transmission. L2 signaling can be a MAC CE (e.g., any UL MAC CE or a different or new dedicated MAC CE designated for L1/L2-centric inter-cell mobility). The L3 signaling can be the RRCReconfigurationComplete message, or a different RRC message. Additionally, or alternatively, the UE 302 can deliver the ACK message via a scheduling request (SR) transmission. As such, the UE 302 can deliver the ACK message with SR according to the network indicated TCI state, which is used to request an uplink (UL) grant for data transmission.

Aspects of the UE 302 transmitting the NACK/DTX message to the first serving cell 304 at 602 relate to the UE transmitting an ACK or NACK/DTX message to the first serving cell at 204 of FIG. 2.

The first serving cell 304 erroneously interprets the NACK/DTX message as an ACK message at 604. As such, the network will communicate with the UE 302 from the second serving cell 306 while the UE 302 attempts to communicate with the network according to the first serving cell 304. This misinterpretation of the NACK/DTX may be caused by a failure of an error correcting procedure employed by the first serving cell 304; a modulation scheme error or coding scheme error on behalf of the UE 302 when generating the NACK/DTX for transmission; destructive interference of the uplink NACK/DTX message signal with another nearby signal; or the like. The UE 302 may not be informed that the network interpreted the NACK/DTX message as an ACK message and may maintain communication with the first serving cell 304.

At 606, the UE 302 maintains communication with the first serving cell 304 after transmitting the NACK/DTX message. At 608, the UE 302 configures and starts a time window after transmitting the NACK/DTX message. In some aspects, the duration of the time window can be configured by the first serving cell 304 through RRC signaling with the UE 302 while the UE 302 is in a connected state with the first serving cell 304. In other aspects, the UE 302 autonomously configures the time window. The time window can start after the first symbol of the NACK/DTX message is transmitted or after the last symbol of the NACK/DTX message is transmitted. Alternatively, the time window may start after an action time associated with the unified TCI downlink signaling at 308. For example, an action timer may be configured by the UE 302 upon reception of the unified TCI, and the time window is started at 608 when the action timer expires.

Aspects of actions at 602, 604, 606, and 608 of FIG. 6 correspond to the UE transmitting the ACK or NACK/DTX message at 204 of FIG. 2 through starting the time window at 210 of FIG. 2.

When, as illustrated in FIG. 6, the UE 302 does not receive dedicated DL signaling from the first serving cell 304 during the time window, the UE 302 will perform a fallback operation indicated generally as 614 to re-establish communication with the network. Several example fallback operations are disclosed herein. While fallback operations can be performed independently, multiple fallback operations may be performed sequentially or concurrently. The fallback operations discussed herein relate to the UE performing the fallback operation at 208 of FIG. 2.

In one example, when the UE 302 receives dedicated DL signaling from the first serving cell 304 the UE 302 resets the time window at 612. In this example, the UE 302 may perform the fallback operation any time dedicated signaling is not received from the first serving cell 304 within the time window of the last received dedicated signaling.

The example fallback operation 616 includes the UE 302 transmitting a contention based random access channel preamble (PRACH) to the first serving cell 304 at 618. The UE 302 can transmit the contention based PRACH according to a preamble previously used by the UE 302 to establish communication with the first serving cell 304. For example, the UE 302 can use a preamble used to communicate with the first serving cell 304 before the NACK/DTX message was transmitted at 602. In other aspects, the UE 302 transmits the contention based PRACH without using previous configuration information.

In some aspects the UE 302 transmits the PRACH according to a 4-step RACH process. The PRACH can be transmitted as a RACH Msg1. In response to the contention based PRACH, the first serving cell 304 can respond with a RACH Msg2 including an UL grant associated with a RACH Msg3. Subsequently, the UE 302 can transmit the RACH Msg3 according to the UL grant at 622.

At 620, the UE 302 can measure beam resources of at least one of the first serving cell 304 or the second serving cell 306. Measuring beam resources can include performing measurements of one or more of a L1-RSRP, PCI, SSB, or CSI-RS associated with one or more beams of the first serving cell 304 or the second serving cell. For example, the UE 302 measures L1-RSRP of one or more beams of the second serving cell 306, determines a beam associated with the highest L1-RSRP of the one or more beams, and transmits a message with at least one of a PCI, SSB, or CSI-RS of the beam associated with the highest L1-RSRP of the second serving cell 306. In another example, the UE 302 measures L1-RSRP of one or more beams of the first serving cell 304 and L1-RSRP of one or more beams of the second serving cell 306. The UE 302 determines which of the first serving cell 304 and the second serving cell 304 has a beam with a highest L1-RSRP.

After performing the measurements, the UE 302 transmits one or more of the PCI, SSB, or CSI-RS associated with the cell (i.e. first serving cell 304 or second serving cell 306) with the highest L1-RSRP. In another example, the L1-RSRP of the second serving cell 306 is higher than the L1-RSRP of the first serving cell 304, and the UE transmits one or more of the PCI, SSB, or CSI-RS associated with the second serving cell 306 to the first serving cell. In another example, the UE 302 transmits the PCI, SSB, or CSI-RS associated with the second serving cell 306 when the L1-RSRP of the second serving cell 306 is higher than the L1-RSRP of the first serving cell 304 and higher than a threshold. The threshold may correspond to one or more of an event threshold corresponding to an Event A1, Event A2, Event A3, Event A4, Event A5, or Event A6, an event based on L1-RSRP, or the like.

For a 4-step RACH, in response to transmitting the contention based PRACH at 618 or measuring the beam resource at 620, the UE 302 transmits the Msg3 RACH to the first serving cell 304 at 622. The message at 622 can include a C-RNTI associated with the first serving cell or a UE ID of the UE. In some aspects, the message at 622 can also include the measured beam resources measured at 620.

For a 2-step RACH, the UE can measure the beam resources 620 before sending the contention based PRACH in a MsgA at 618. The message at 618 can include a C-RNTI associated with the first serving cell or a UE ID of the UE. In some aspects, the message at 618 can also include the measured beam resources measured at 620. The network uses the C-RNTI to associate the proper serving cell with the UE 302 thereby resolving the serving cell mismatch.

Figure 7:
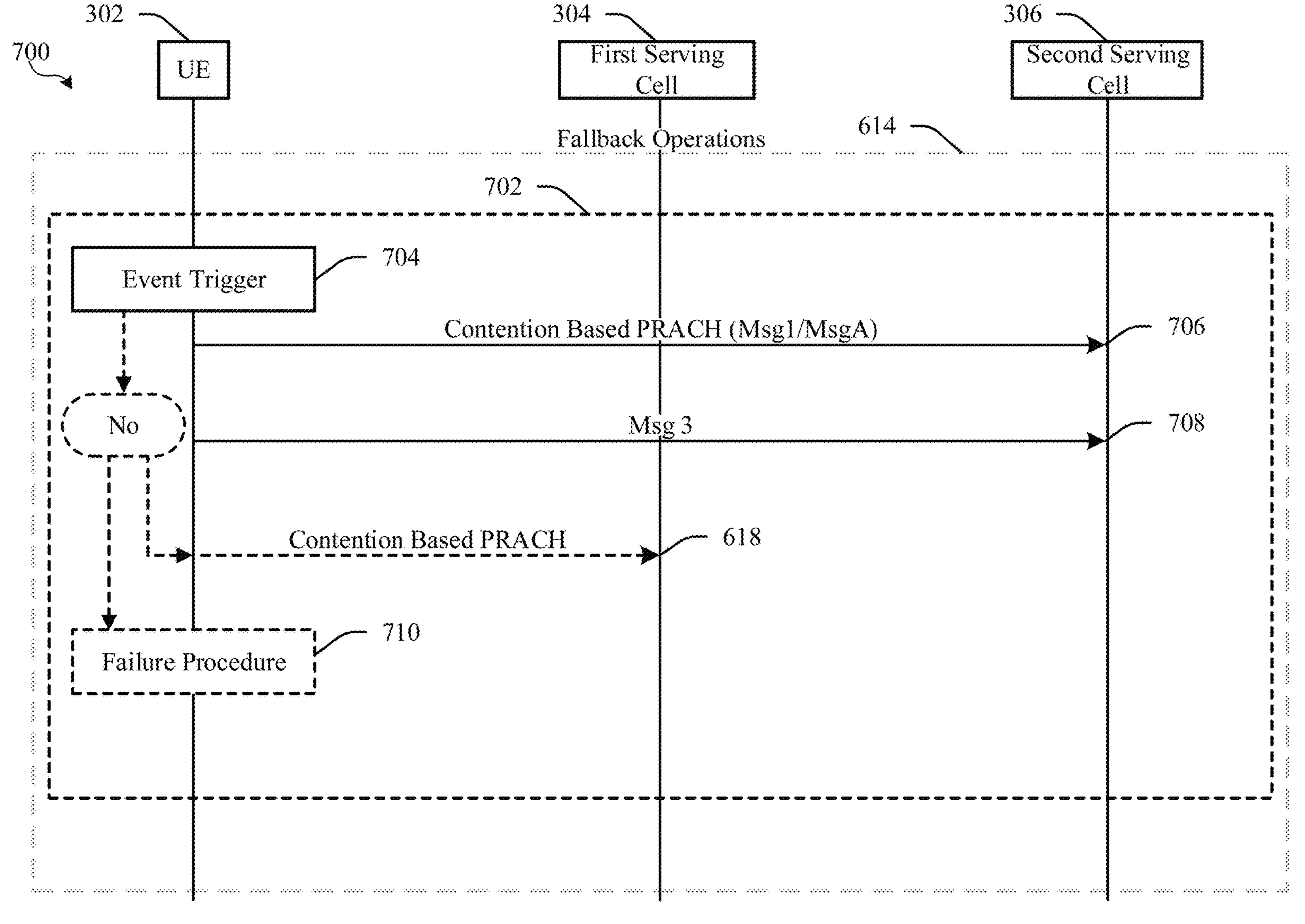
FIG. 7 is a signal flow diagram for an example event triggered contention based preamble RACH (PRACH) based fallback operation associated with the back-off mechanism of FIG. 6, in accordance with various aspects disclosed.

FIG. 7 is a signal flow diagram 700 for an example event triggered contention based PRACH based fallback operation 702 associated with the back-off mechanism of FIG. 6. The signal flow diagram 700 describes additional or alternative operations of the fallback operation at 614 and the signal flow diagram 700 is preceded by acts 308, 602, 604, 606, 608, 610, and 612 of FIG. 6.

The fallback operation 702 includes the UE 302 detecting an event trigger at 704. The event trigger is based on an L1-RSRP threshold, where when the L1-RSRP threshold is satisfied, the UE 302 transmits a contention based PRACH in a RACH Msg1 or RACH MsgA at 706. The L1-RSRP threshold can be associated with one or more of an Event A1, Event A2, Event A3, Event A4, Event A5, or Event A6, an event based on L1-RSRP, or the like. Furthermore, the L1-RSRP threshold can be satisfied by the second serving cell 306 or a different serving cell. The different serving cell may not be indicated by the unified TCI at 308 of FIG. 6. At 706 the contention based PRACH is transmitted according to the cell that satisfies the L1-RSRP threshold i.e. the second serving cell 306 or the different serving cell.

Subsequently, the UE transmits a RACH Msg3 to the one of second serving cell 306 or the new serving cell at 708 according to the cell associated with satisfying the L1-RSRP threshold. The UE can report a C-RNTI in the RACH Msg3 or RACH MsgA. The C-RNTI can be associated with the second serving cell 306, of the different serving cell, or the UE ID. For example, if the UE 302 is not configured with a C-RNTI of one of the second serving cell 306 or a different serving cell, the UE 302 will report the C-RNTI will be associated with the UE ID.

In some aspects, the UE 302 may not detect an event trigger within a designated period. For example, if no event trigger is detected at 704, the UE 302 will transmit a contention based PRACH to the first serving cell at 618. Aspects associated with the contention based PRACH for the first serving cell include the operations discussed at act 618 of FIG. 6. In another example, if no event trigger is detected at 704, the UE 302 will perform one or more of a radio link failure procedure, a beam failure recovery procedure, or a candidate beam detection procedure at 710. As a result of the fallback operations 702, the UE 302 resolves the serving cell mismatch through the contention based procedure with the first serving cell 304 or the second serving cell 306, or an alternative serving cell; or resolves the serving cell mismatch through radio link failure, beam failure recovery, or candidate beam detection procedure.

Figure 8:
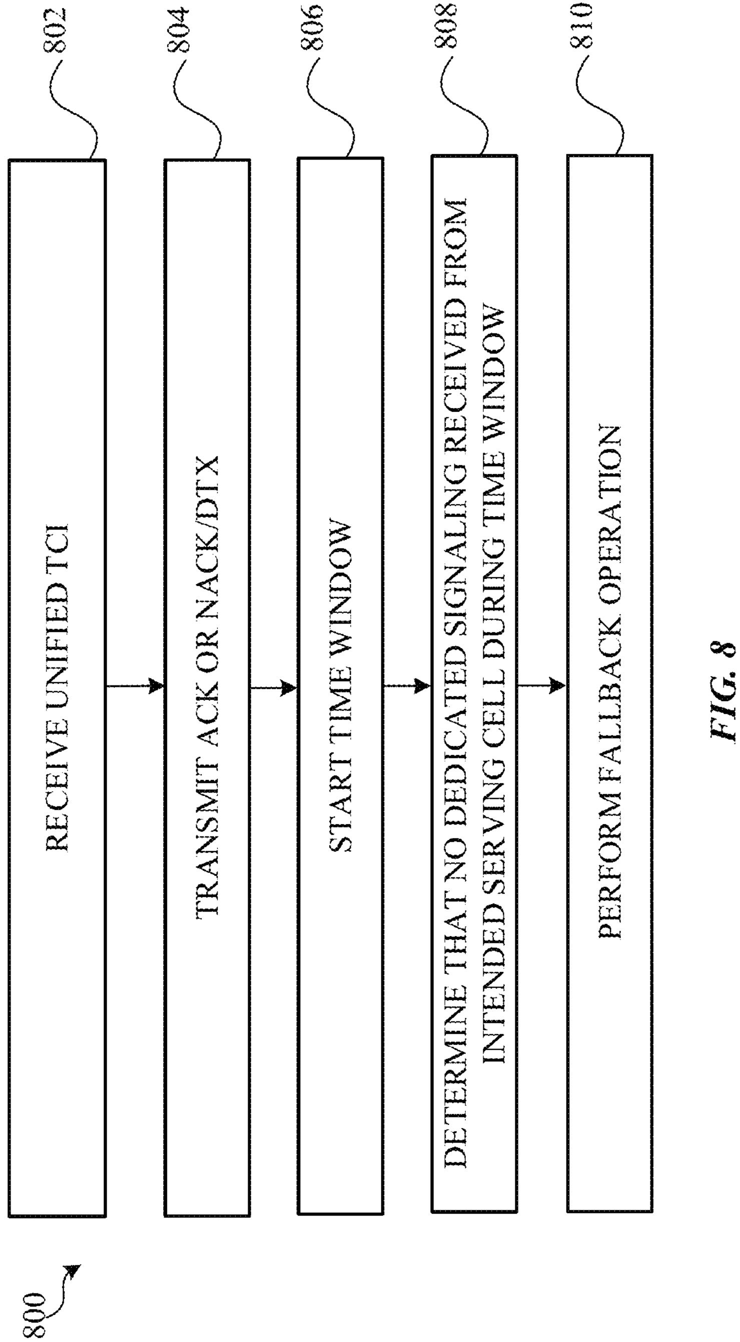
FIG. 8 illustrates a flow diagram of an example method for a back-off mechanism when a UE transmits an ACK or a NACK/DTX associated with a unified TCI, in accordance with various aspects disclosed.

FIG. 8 illustrates a flow diagram of a method 800 for a back-off mechanism when a UE 302 transmits an ACK or a NACK/DTX associated with a unified TCI. The method 800 may be performed, for example by UE 101 of FIG. 1 and/or UE 302 of FIGS. 3-7.

At 802, the method includes receiving a unified TCI. FIG. 3 at 308 and FIG. 6 at 308 corresponds to some aspects of act 802.

At 804, the method includes transmitting an ACK or a NACK/DTX associated with the unified TCI. FIG. 3 at 310 and FIG. 6 at 602 corresponds to some aspects of act 804.

At 806, the method includes configuring a time window associated with receiving the unified TCI or associated with transmitting the ACK or NACK/DTX. FIG. 3 at 318 and FIG. 6 at 608 corresponds to some aspects of act 806.

At 808, it is determined that no dedicated signaling has been received from the intended serving cell (e.g., the first serving cell when a NACK was transmitted or the second serving cell when an ACK was transmitted) during the time window.

At 810, the method includes performing a fallback operation associated with a L1/L2-centric inter-cell mobility failure. FIG. 3 at 326 and 328, FIG. 4 at 402, FIG. 5 at 324, FIG. 6 at 616, and FIG. 7 at 702 corresponds to some aspects of act 808.

Figure 9:
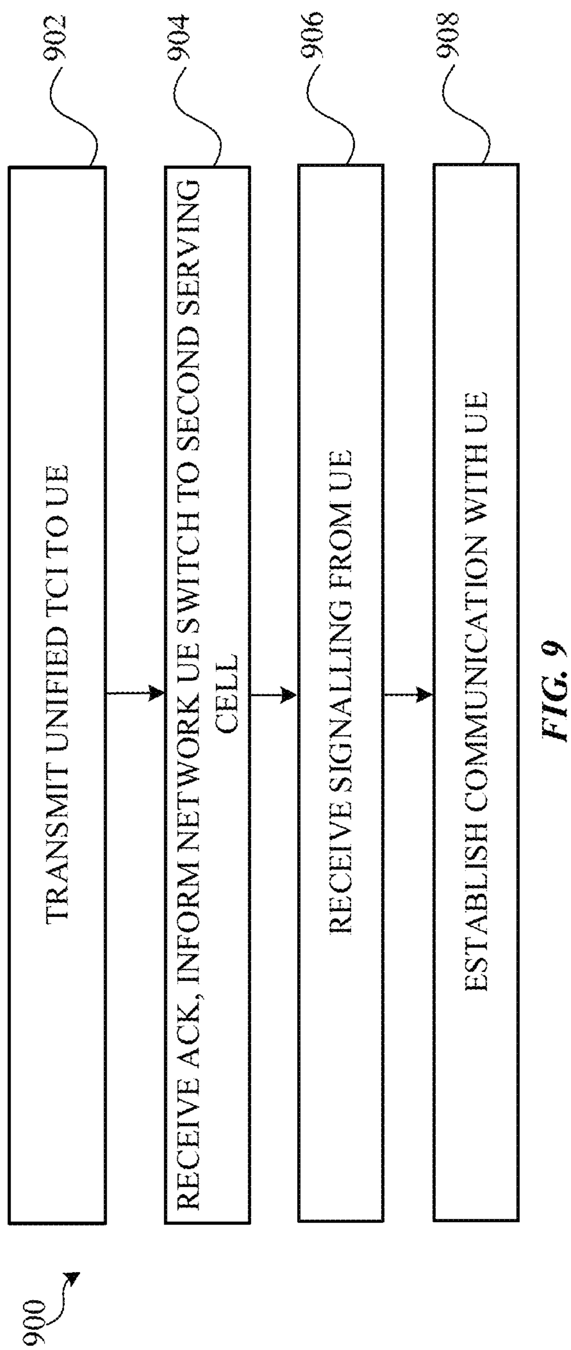
FIG. 9 illustrates a flow diagram of an example method for a back-off mechanism associated with a first serving cell when a UE transmits a NACK/DTX associated with a unified TCI, in accordance with various aspects disclosed.

FIG. 9 illustrates a flow diagram of a method 900 for a back-off mechanism performed in response to a serving cell mismatch. The method 900 may be performed, for example by BS 111*a* of FIG. 1 or first serving cell 304 of FIGS. 3-7.

At 902, the method includes transmitting a unified TCI to a UE that indicates that the UE should switch communication to a second serving cell.

At 904, the method includes receiving an ACK. In the example of FIG. 9, the received ACK is a misinterpretation of a NACK/DTX transmitted by the UE. Thus, the UE intends to continue communication with serving cell. The method includes, at 904, informing the network that the UE will be switching the second serving cell.

At 906, signaling is received from the UE to resolve a serving cell mismatch.

At 908, communication with the UE is re-established to resolve the serving cell mismatch.

Additional Signaling to Avoid Serving Cell Mismatch

Figure 10:
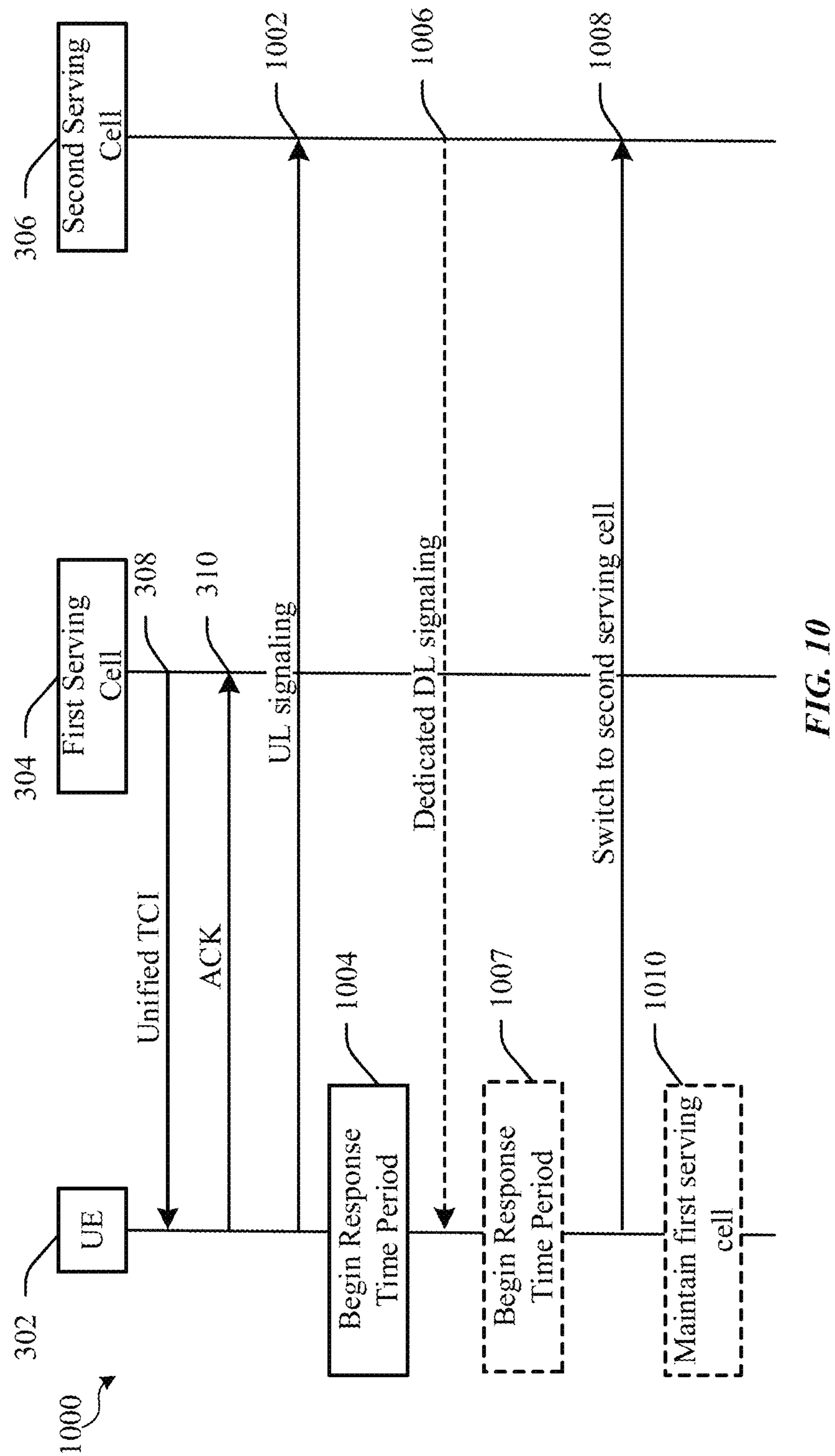
FIG. 10 is a signal flow diagram outlining an example of additional signaling for a L1/L2-centric inter-cell mobility operation to avoid a serving cell mismatch, in accordance with various aspects disclosed.

FIG. 10 is a signal flow diagram 1000 outlining exemplary additional signaling for a L1/L2-centric inter-cell mobility operation to avoid a serving cell mismatch. The signaling of FIG. 10 occurs in L1/L2/L3 between the UE 302, the first serving cell 304, and the second serving cell 306 and includes aspects of the signaling described corresponding to FIGS. 3-7.

At 308, the first serving cell 304 transmits a unified TCI to the UE 302 and includes aspects discussed in FIG. 3 regarding act 308. The unified TCI may be carried by a MAC signaling or a DCI signaling.

In response to receiving the unified TCI, at 310 the UE 302 transmits an ACK message to the first serving cell 304. The ACK message corresponds to the MAC CE or DCI received from the first serving cell 304 at 308 and serves as an acknowledgment of receiving the unified TCI. Aspects discussed in FIG. 3 regarding act 310 also relate to aspects of FIG. 10 at 310. The UE 302 can switch to the second serving cell 306 or configure a L1/L2-centric inter-cell mobility handover to the second serving cell 306 as a result of the unified TCI or the ACK.

One way for the UE 302 to avoid a serving cell mismatch is for the UE 302 to maintain communication with the first serving cell 304 until the UE 302 determines that the network is configured to communicate with the UE 302 accord to the second serving cell 306.

As such, the UE 302 can generate a UL signal to the second serving cell 306 at 1002 while the UE 302 maintains communication with the first serving cell 304. The UL signal may be generated in response to the MAC or DCI signaling associated with the unified TCI. Alternatively, the UL signal may be generated in response to a DCI other than the DCI associated with the unified TCI. The UL signal may, for example, be or comprise one or more of a predefined resource, a SRS signal, or an appropriate interrogation signal. The UL signal can indicate to the second serving cell 306 that the UE 302 will switch communication to the second serving cell 306.

For example, after transmitting the UL signal, the UE 302 begins a response time period at 1004, and switches communication to the second serving cell 306 at 1008 at the expiration of the response time period 1004. The response time period can be associated with a number of symbols or slots after transmitting the UL signal.

In another example, the UE receives a dedicated DL signaling at 1006 in response to the UL signal. The dedicated DL signaling can be a downlink confirmation of the UL signal. Instead of configuring the response time period after transmitting the UL signal, in this example the UE 302 begins a response time period 1007 after receiving the dedicated DL signaling and switches communication to the second serving cell at 1008 at the expiration of the response time period 1007. The response time period can be associated with a number of symbols or slots after receiving the dedicated DL signal.

The response time period can be predefined, for example, the response time period can be 28 symbols. Alternatively, the response time period can be configured by the first serving cell 304 by RRC, MAC CE, or DCI signaling.

The UL signal can be associated with a PRACH, SRS, PUCCH, or PUSCH. For example, the UL signal is associated with a contention based PRACH and the dedicated DL signal is a PRACH response message in at least one of a dedicated search space or a control resource set. The at least one of a dedicated search space or a control resource set can be configured by RRC signaling associated with the first serving cell 304, or configured by a PDCCH associated with the second serving cell 306 where the PDCCH is based on a radio network temporary identifier (RNTI) of the UE 302. Furthermore, the RNTI can be configured by RRC associated with the first serving cell 304 or predefined. The PDCCH can be a designated PDCCH for a PRACH associated with the L1/L2-centric inter-cell mobility failure.

In another example, the UL signal is associated with a PUCCH and the dedicated DL signal includes a DCI where the DCI is associated with a C-RNTI associated with the UE 302.

In another example, the UL signal is associated with a SRS and the dedicated DL signal is received in at least one of one of a dedicated search space or a control resource set. The at least one of a dedicated search space or a control resource set can be configured by RRC signaling associated with the first serving cell 304, or configured by a PDCCH associated with the second serving cell 306 where the PDCCH is based on a radio network temporary identifier (RNTI) of the UE 302. Furthermore, the RNTI can be configured by RRC associated with the first serving cell 304 or predefined. The PDCCH can be a designated PDCCH for a PRACH associated with the L1/L2-centric inter-cell mobility failure.

In another example, the UL signal is associated with a PUSCH and the dedicated DL signal is received in a PDCCH. The PDCCH schedules a new transmission with a same hybrid automatic repeat request (HARQ) process as the PUSCH. Furthermore, the new transmission can be scheduled with a toggled new data indicator (NDI).

In some aspects, if the UL signal fails or the dedicated DL signal is not received within the time period and the UE 302 maintains connection with the first serving cell. As such, the UE 302 does not apply an indicated TCI state corresponding to the second serving cell 306, and cancels communication with the second serving cell 306.

The signal flow diagram 1000 can prevent a serving cell mismatch. The UE 302 maintains connection with the first serving cell while resolving the TCI state corresponding to the unified TCI at 308. In one aspect, the UE 302 validates that the network is ready to communicate through the second serving cell 306 through acts 1002, 1004, and 1006 before switching to the second serving cell at 1008. In another aspect, the UE 302 determines that the network will not communicate through the second serving cell 306 through acts 1002, 1004, and 1010, and maintains connection through the first serving cell. Thus connection between the UE 302 and the network is maintained while the UE 302 determines if it should communicate with the network through one of the first serving cell 304 or the second serving cell 306.

Figure 11:
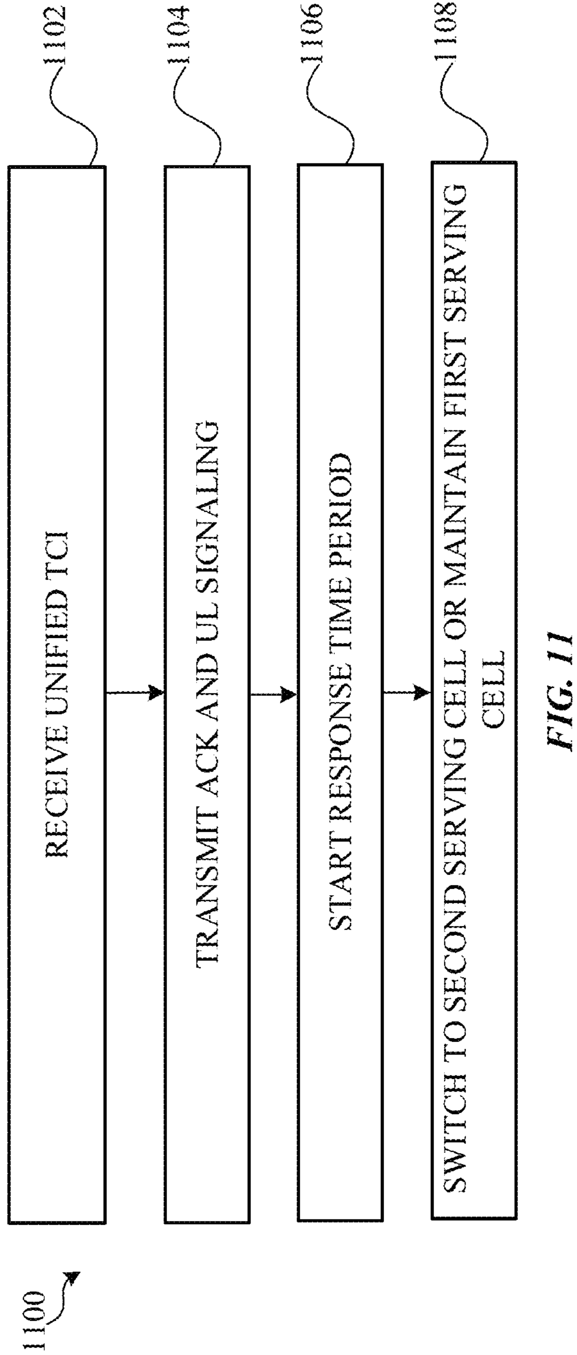
FIG. 11 illustrates a flow diagram of an example method for additional signaling to avoid a serving cell mismatch when a UE transmits an ACK in response to a unified TCI, in accordance with various aspects disclosed.

FIG. 11 illustrates a flow diagram of an example method 1100 for additional signaling to avoid a serving cell mismatch. The example method 1100 may be performed, for example by UE 101 of FIG. 1 and/or UE 302 of FIG. 10.

At 1102, the method includes receiving a unified TCI. FIG. 3 at 308 and FIG. 10 at 308 corresponds to some aspects of act 1102.

At 1104, the method includes transmitting an ACK and UL signaling associated with the unified TCI. FIG. 10 at 310 and 1002 corresponds to some aspects of act 1104.

At 1106, the method includes starting a response time period. FIG. 10 at 1004 and 1006 corresponds to some aspects of act 1106.

At 1108, the method includes switching to a second serving cell 306 or maintaining communication with the first serving cell 304. FIG. 10 at 1008 and 1010 corresponds to some aspects of act 1108.

Figure 12:
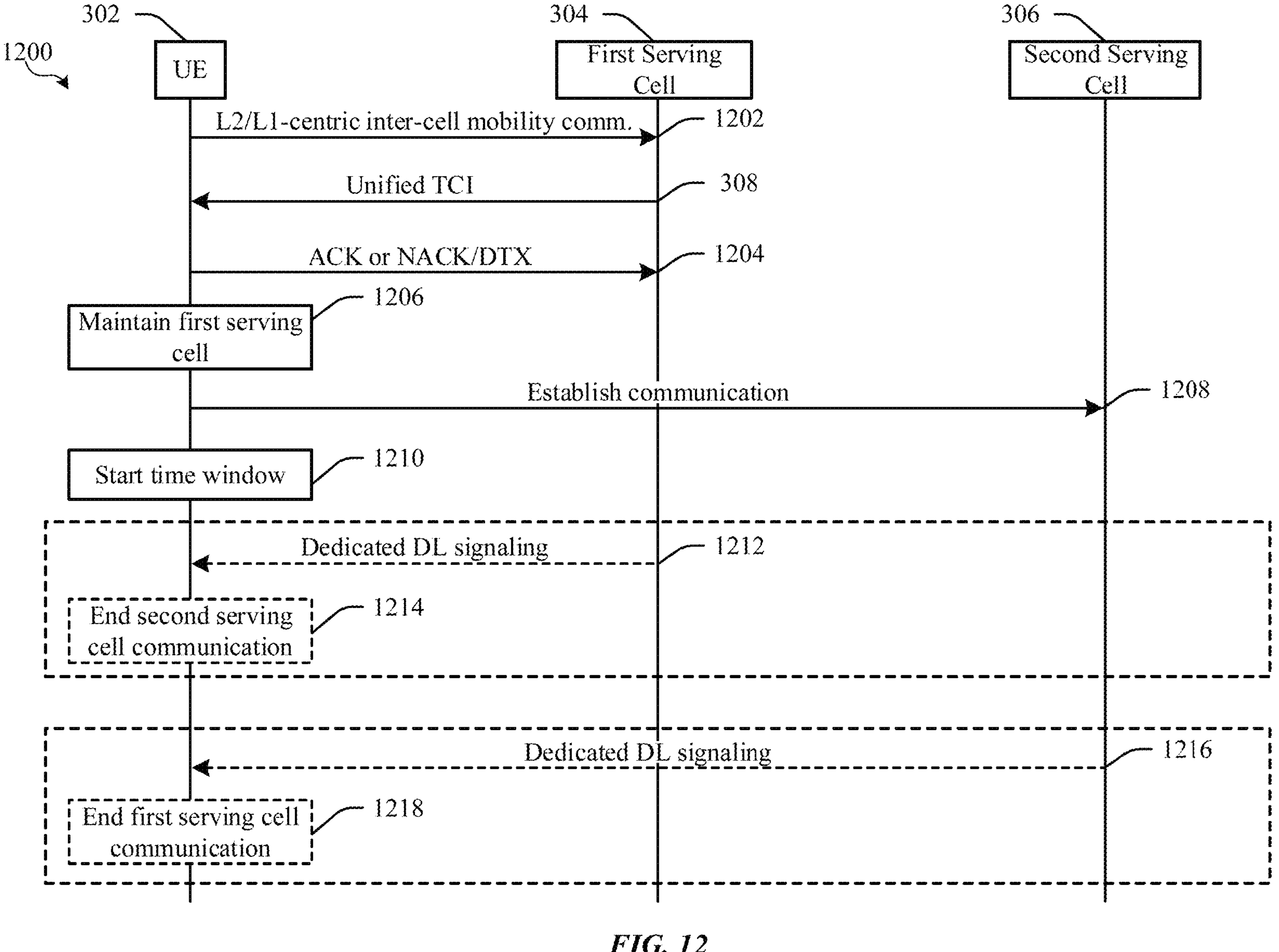
FIG. 12 is a signal flow diagram outlining an example of additional signaling for a L1/L2-centric inter-cell mobility operation where a UE communicates with two serving cells to avoid a serving cell mismatch, in accordance with various aspects disclosed.

FIG. 12 is a signal flow diagram 1200 outlining exemplary additional signaling a UE may perform to avoid a serving cell mismatch. The signaling of FIG. 10 occurs in L1/L2/L3 between the UE 302, the first serving cell 304, and the second serving cell 306 and includes aspects of the signaling described corresponding to FIGS. 3, 6, and 10.

At 1202 the UE 302 establishes L2/L1-centric inter-cell mobility communication with the first serving cell 304. For example, the UE 302 communicates with the first serving cell 304 according to a first unified TCI that can include a TCI state and associated information for the UE 302 to establish communication with the first serving cell 304.

At 308, the first serving cell 304 transmits a unified TCI to the UE 302 that includes aspects discussed in FIG. 3 regarding act 308. For example, the unified TCI can be a second unified TCI corresponding to the second serving cell 306.

At 1204, the UE transmits either an ACK or a NACK/DTX to the first serving cell 304 in response to the unified TCI. Transmitting the ACK or the NACK/DTX can, for example, include the features discussed in FIG. 3 at act 310 or FIG. 6 at 602.

At 1206, the UE 302 maintains communication with the first serving cell 304 according to configuration information in the first unified TCI.

At 1208, the UE 302 establishes communication with the second serving cell 306. The UE 302 establishes communication with the second serving cell 306 according to configuration information in the second unified TCI.

At 1210 the UE 302 starts a time window during which the UE 302 maintains communication with the first serving cell 304 and the second serving cell. The time window can be associated with a number of symbols or slots. The time window can include various time window features discussed at 318 of FIG. 3 and 608 of FIG. 6.

The UE 302 can communicate with both the first serving cell 304 and the second serving cell 306 according to a multi-DCI based inter-cell multi transmission reception point (multi-TRP) operation. According to the multi-DCI based inter-cell multi-TRP operation, the UE 302 communicates with both the first serving cell 304 and the second serving cell 306 similar to a soft handover. Specifically, the UE 302 can receive PDCCH signaling from both the first serving cell 304 and the second serving cell 306 and signaling from the first serving cell 304 and the second serving cell 306 can be multiplexed together in any manner. For examples, one or more signals from the first serving cell 304 and the second serving cell 306 are multiplexed based on at least one of a time division multiplexing (TDM), a frequency division multiplexing (FDM), or a space division multiplexing (SDM). In some aspects, the UE may communicate with TDM or SDM and time/frequency resources associated with TDM or SDM for each of the first serving cell 304 and the second serving cell 306 are configured by higher layer signaling.

In some aspects, a subcarrier spacing for the first serving cell 304 and the second serving cell 306 are in the same bandwidth part (BWP). As such, the BWP can include a first set of RRC parameters for L1 signaling including a PDCCH configuration.

In other aspects, a first BWP associated with the first serving cell 304 is different than a second BWP associated with the second serving cell 306. As such, the UE 302 can be configured with both a first set and a second set of RRC parameters for L1 signaling for both the first serving cell 304 and the second serving cell 306.

The UE 302 can subsequently end communication with either the first serving cell 304 or the second serving cell when the time window expires.

For example, at 1212 the UE 302 receives dedicated DL signaling from the first serving cell 304 within the time window. The dedicated DL signaling from the first serving cell 304 can include the dedicated DL signaling features discussed at 610 of FIG. 6. At 1214 the UE 302 can end the second serving cell 306 communication and continue communicating with the first serving cell 304 in response to the dedicated DL signaling from the first serving cell 304. As such, serving cell mismatch is avoided due to a potential ACK or NACK/DTX misinterpretation and the UE 302 maintains uninterrupted communication with the network through the first serving cell 304.

In another example, when the UE 302 does not receive dedicated DL signaling from the second serving cell 306 during the time window, the UE 302 can end the second serving cell 306 communications at 1214 and continue communicating with the first serving cell 304. As such, serving cell mismatch is avoided due to a potential ACK or NACK/DTX misinterpretation and the UE 302 maintains uninterrupted communication with the network through the first serving cell 304.

In another example, at 1216 the UE 302 receives dedicated DL signaling from the second serving cell 306 within the time window. The dedicated DL signaling from the second serving cell 306 can include the dedicated DL signaling features discussed at 320 of FIG. 3. At 1218 the UE 302 can end the first serving cell 304 communication and continue communicating with the second serving cell 306 in response to the dedicated DL signaling from the second serving cell 306. As such, serving cell mismatch is avoided due to a potential ACK or NACK/DTX misinterpretation and the UE 302 maintains uninterrupted communication with the network through the second serving cell 306.

Figure 13:
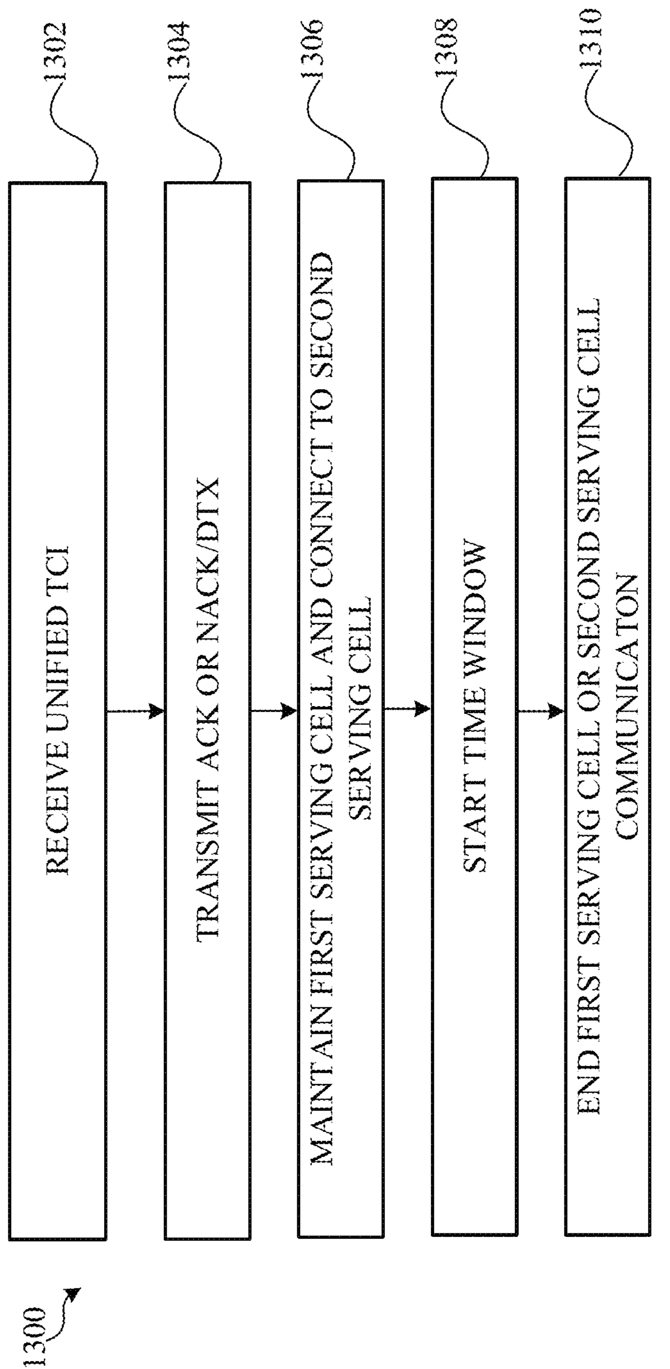
FIG. 13 illustrates a flow diagram of an example method for additional signaling where a UE communicates with two serving cells to avoid a serving cell mismatch, in accordance with various aspects disclosed.

FIG. 13 illustrates a flow diagram of a method 1300 for exemplary additional signaling that can be performed by a UE to avoid a serving cell mismatch. The method 1300 may be performed, for example, by UE 101 of FIG. 1 and/or UE 302 of FIG. 10.

At 1302, the method includes receiving a unified TCI associated with a second serving cell 306. FIG. 12 at 1202 and 308 correspond to some aspects of act 1302.

At 1304, the method includes transmitting an ACK or ACK/DTX associated with the second unified TCI. FIG. 12 at 1204 corresponds to some aspects of act 1304.

At 1306, method includes maintaining connection with the first serving cell 304 and establishing a connection with the second serving cell 306. FIG. 12 at 1206 and 1208 correspond to some aspects of act 1306.

At 1308, the method includes starting a time window to receive a dedicated DL signaling. FIG. 12 at 1210 corresponds to some aspects of act 1308.

At 1310, the UE 302 the method includes ending communication with the first serving cell 304 or the second serving cell 306 at the expiration of the time window based on received dedicated DL signaling. FIG. 12 at 1212, 1214, 1216 and 1218 correspond to some aspects of act 1310.

Figure 14:
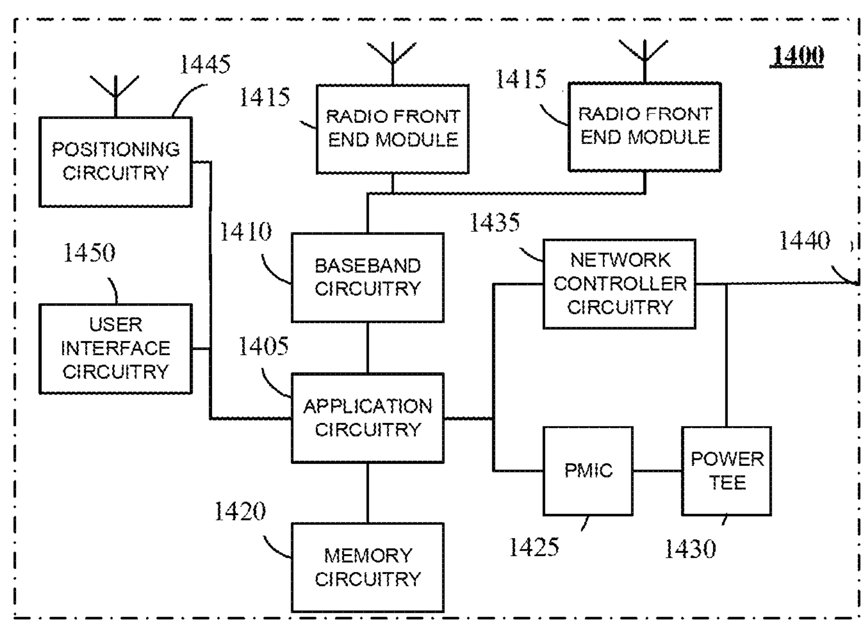
FIG. 14 illustrates an example of an infrastructure equipment, in accordance with various aspects disclosed.

FIG. 14 illustrates an example of infrastructure equipment 1400 in accordance with various aspects. The infrastructure equipment 1400 (or "system 1400") may be implemented as a base station, radio head, RAN node such as the BS 111*a*, BS 111*b*, or network nodes 112 of FIG. 1 and/or any other element/device discussed herein. In other examples, the system 1400 could be implemented in or by a UE.

The system 1400 includes application circuitry 1405, baseband circuitry 1410, one or more radio front end modules (RFEMs) 1415, memory circuitry 1420, power management integrated circuitry (PMIC) 1425, power tee circuitry 1430, network controller circuitry 1435, network interface connector 1440, satellite positioning circuitry 1445, and user interface 1450. In some aspects, the device 1400 may include additional elements such as, for example, memory/storage, display, camera, sensor, or input/output (I/O) interface. In other aspects, the components described below may be included in more than one device. For example, said circuitries may be separately included in more than one device for CRAN, vBBU, or other like implementations.

Application circuitry 1405 includes circuitry such as, but not limited to one or more processors (or processor cores), cache memory, and one or more of low drop-out voltage regulators (LDOs), interrupt controllers, serial interfaces such as SPI, I2C or universal programmable serial interface module, real time clock (RTC), timer-counters including interval and watchdog timers, general purpose input/output (I/O or IO), memory card controllers such as Secure Digital (SD) MultiMediaCard (MMC) or similar, Universal Serial Bus (USB) interfaces, Mobile Industry Processor Interface (MIPI) interfaces and Joint Test Access Group (JTAG) test access ports. The processors (or cores) of the application circuitry 1405 may be coupled with or may include memory/storage elements and may be configured to execute instructions stored in the memory/storage to enable various applications or operating systems to run on the system 1400. In some implementations, the memory/storage elements may be on-chip memory circuitry, which may include any suitable volatile and/or non-volatile memory, such as DRAM, SRAM, EPROM, EEPROM, Flash memory, solid-state memory, and/or any other type of memory device technology, such as those discussed herein.

The processor(s) of application circuitry 1405 may include, for example, one or more processor cores (CPUs), one or more application processors, one or more graphics processing units (GPUs), one or more reduced instruction set computing (RISC) processors, one or more Acorn RISC Machine (ARM) processors, one or more complex instruction set computing (CISC) processors, one or more digital signal processors (DSP), one or more FPGAs, one or more PLDs, one or more ASICs, one or more microprocessors or controllers, or any suitable combination thereof. In some aspects, the application circuitry 1405 may comprise, or may be, a special-purpose processor/controller to operate according to the various aspects herein. As examples, the processor(s) of application circuitry 1405 may include one or more Apple® processors, Intel® processor(s); Advanced Micro Devices (AMD) Ryzen® processor(s), Accelerated Processing Units (APUs), or Epyc® processors; ARM-based processor(s) licensed from ARM Holdings, Ltd. such as the ARM Cortex-A family of processors and the ThunderX2® provided by Cavium™, Inc.; a MIPS-based design from MIPS Technologies, Inc. such as MIPS Warrior P-class processors; and/or the like. In some aspects, the system 1400 may not utilize application circuitry 1405, and instead may include a special-purpose processor/controller to process IP data received from an EPC or 5GC, for example.

User interface circuitry 1450 may include one or more user interfaces designed to enable user interaction with the system 1400 or peripheral component interfaces designed to enable peripheral component interaction with the system 1400. User interfaces may include, but are not limited to, one or more physical or virtual buttons (e.g., a reset button), one or more indicators (e.g., light emitting diodes (LEDs)), a physical keyboard or keypad, a mouse, a touchpad, a touchscreen, speakers or other audio emitting devices, microphones, a printer, a scanner, a headset, a display screen or display device, etc. Peripheral component interfaces may include, but are not limited to, a nonvolatile memory port, a universal serial bus (USB) port, an audio jack, a power supply interface, etc.

The components shown by FIG. 14 may communicate with one another using interface circuitry, which may include any number of bus and/or interconnect (IX) technologies such as industry standard architecture (ISA), extended ISA (EISA), peripheral component interconnect (PCI), peripheral component interconnect extended (PCIx), PCI express (PCIe), or any number of other technologies. The bus/IX may be a proprietary bus, for example, used in a SoC based system. Other bus/IX systems may be included, such as an I2C interface, an SPI interface, point to point interfaces, and a power bus, among others.

Figure 15:
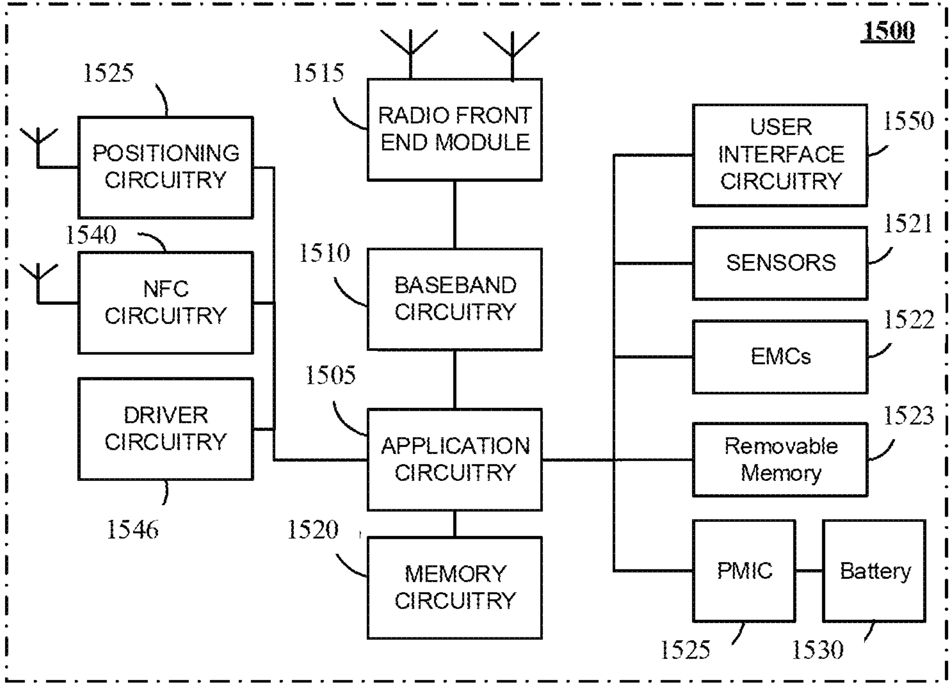
FIG. 15 illustrates an example of a UE platform, in accordance with various aspects disclosed.

FIG. 15 illustrates an example of a platform 1500 (or "device 1500") in accordance with various aspects. In aspects, the computer platform 1500 may be suitable for use as UEs 101*a*, 101*b* of FIG. 1, network nodes 111*a*, 111*b* of FIG. 1, and/or any other element/device discussed herein. The platform 1500 may include any combinations of the components shown in the example. The components of platform 1500 may be implemented as integrated circuits (ICs), portions thereof, discrete electronic devices, or other modules, logic, hardware, software, firmware, or a combination thereof adapted in the computer platform 1500, or as components otherwise incorporated within a chassis of a larger system. The block diagram of FIG. 15 is intended to show a high level view of components of the computer platform 1500. However, some of the components shown may be omitted, additional components may be present, and different arrangement of the components shown may occur in other implementations.

Application circuitry 1505 includes circuitry such as, but not limited to one or more processors (or processor cores), cache memory, and one or more of LDOs, interrupt controllers, serial interfaces such as SPI, I2C or universal programmable serial interface module, RTC, timer-counters including interval and watchdog timers, general purpose I/O, memory card controllers such as SD MMC or similar, USB interfaces, MIPI interfaces, and JTAG test access ports. The processors (or cores) of the application circuitry 1505 may be coupled with or may include memory/storage elements and may be configured to execute instructions stored in the memory/storage to enable various applications or operating systems to run on the system 1500. In some implementations, the memory/storage elements may be on-chip memory circuitry, which may include any suitable volatile and/or non-volatile memory, such as DRAM, SRAM, EPROM, EEPROM, Flash memory, solid-state memory, and/or any other type of memory device technology, such as those discussed herein.

As examples, the processor(s) of application circuitry 1505 may include a general or special purpose processor, such as an A-series processor (e.g., the A13 Bionic), available from Apple® Inc., Cupertino, CA or any other such processor. The processors of the application circuitry 1505 may also be one or more of Advanced Micro Devices (AMD) Ryzen® processor(s) or Accelerated Processing Units (APUs); Core processor(s) from Intel® Inc., Snapdragon™ processor(s) from Qualcomm® Technologies, Inc., Texas Instruments, Inc.® Open Multimedia Applications Platform (OMAP)™ processor(s); a MIPS-based design from MIPS Technologies, Inc. such as MIPS Warrior M-class, Warrior I-class, and Warrior P-class processors; an ARM-based design licensed from ARM Holdings, Ltd., such as the ARM Cortex-A, Cortex-R, and Cortex-M family of processors; or the like. In some implementations, the application circuitry 1505 may be a part of a system on a chip (SoC) in which the application circuitry 1505 and other components are formed into a single integrated circuit, or a single package.

The baseband circuitry or processor 1510 may be implemented, for example, as a solder-down substrate including one or more integrated circuits, a single packaged integrated circuit soldered to a main circuit board or a multi-chip module containing two or more integrated circuits.

The platform 1500 may also include interface circuitry (not shown) that is used to connect external devices with the platform 1500. The external devices connected to the platform 1500 via the interface circuitry include sensor circuitry 1521 and electro-mechanical components (EMCs) 1522, as well as removable memory devices coupled to removable memory circuitry 1523.

A battery 1530 may power the platform 1500, although in some examples the platform 1500 may be mounted deployed in a fixed location, and may have a power supply coupled to an electrical grid. The battery 1530 may be a lithium ion battery, a metal-air battery, such as a zinc-air battery, an aluminum-air battery, a lithium-air battery, and the like. In some implementations, such as in V2X applications, the battery 1530 may be a typical lead-acid automotive battery.

While the methods are illustrated and described above as a series of acts or events, it will be appreciated that the illustrated ordering of such acts or events are not to be interpreted in a limiting sense. For example, some acts may occur in different orders and/or concurrently with other acts or events apart from those illustrated and/or described herein. In addition, not all illustrated acts may be required to implement one or more aspects or examples of the disclosure herein. Also, one or more of the acts depicted herein may be carried out in one or more separate acts and/or phases. In some examples, the methods illustrated above may be implemented in a computer readable medium using instructions stored in a memory. Many other examples and variations are possible within the scope of the claimed disclosure.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

As it is employed in the subject specification, the term "processor" can refer to substantially any computing processing unit or device including, but not limited to including, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit, a digital signal processor, a field programmable gate array, a programmable logic controller, a complex programmable logic device, a discrete gate or transistor logic, discrete hardware components, or any combination thereof designed to perform the functions and/or processes described herein. Processors can exploit nano-scale architectures such as, but not limited to, molecular and quantum-dot based transistors, switches and gates, in order to optimize space usage or enhance performance of mobile devices. A processor can also be implemented as a combination of computing processing units.

Examples (aspects) can include subject matter such as a method, means for performing acts or blocks of the method, at least one machine-readable medium including instructions that, when performed by a machine (e.g., a processor with memory, an application-specific integrated circuit (ASIC), a field programmable gate array (FPGA), or the like) cause the machine to perform acts of the method or of an apparatus or system for concurrent communication using multiple communication technologies according to aspects and examples described herein.

Example 1 is a baseband processor configured to: receive a unified transmission configuration indicator (TCI) from a first serving cell wherein the unified TCI is associated with a second serving cell; in response to receiving the unified TCI, transmit an ACK message to the first serving cell; communicate with the second serving cell; and configure a time window subsequent to transmission of the ACK message; and perform a fallback operation when a dedicated signaling from the second serving cell is not received within the time window.

Example 2 comprises the subject matter of example 1, wherein the fallback operation comprises configuring operations to communicate with the first serving cell.

Example 3 comprises the subject matter of example 1, wherein the fallback operation comprises generating a contention based random access channel preamble (PRACH) associated with the second serving cell.

Example 4 comprises the subject matter of example 3, further configured to generate a medium access control (MAC) control element (CE) associated with Layer 1 (L1)/Layer 2 (L2)-centric inter-cell mobility communications in a message 3 (Msg3) RACH or a message A (MsgA) RACH, wherein the MAC CE includes information about the first serving cell or the second serving cell.

Example 5 comprises the subject matter of example 1, wherein the fallback operation comprises generating a contention free random access channel preamble (PRACH) associated with the second serving cell, wherein the contention free PRACH is based on a radio resource control (RRC) signaling associated with the first serving cell.

Example 6 comprises the subject matter of example 5, further configured to receive a response message in at least one of a dedicated search space or control resource set wherein the at least one of the dedicated search space or control resource set are configured by the RRC signaling or a physical downlink control channel (PDCCH) of the second serving cell and based on a radio network temporary identifier (RNTI) of a user equipment (UE) associated with the baseband processor, wherein the response message is initiated by the contention free PRACH.

Example 7 comprises the subject matter of any of example(s) 5-6, further configured to generate operations for re-transmitting the contention free PRACH.

Example 8 comprises the subject matter of example 7, further configured to generate a contention based PRACH associated with the second serving cell in response to re-transmitting the contention free PRACH a configurable maximum number of times.

Example 9 comprises the subject matter of example 7, further configured to, in response to re-transmitting the contention free PRACH a configurable maximum number of times, execute one or more of a radio link failure procedure, a beam failure recovery procedure, or a candidate beam detection procedure.

Example 10 comprises the subject matter of example 1, wherein the fallback operation comprises, generating a scheduling request (SR) associated with the second serving cell.

Example 11 comprises the subject matter of example 10, further configured to configure the SR based on a physical uplink control channel (PUCCH) resource configured by a radio resource control (RRC) signaling associated with the first serving cell.

Example 12 comprises the subject matter of example 10, further configured to: receive a downlink control information (DCI) from the second serving cell after configuring the SR, wherein the DCI is based on a cell radio network temporary identifier (C-RNTI) associated with the baseband processor.

Example 13 comprises the subject matter of any of example(s) 10-12, further configured to: receive an uplink grant associated with the SR from the second serving cell;

and generate a medium access control (MAC) control element (CE) associated with Layer 1 (L1)/Layer 2 (L2)-centric inter-cell mobility communications, wherein the MAC CE includes information about the first serving cell or the second serving cell.

Example 14 comprises the subject matter of example 13, wherein the MAC CE includes at least one of a C-RNTI associated with the first serving cell, a C-RNTI associated the second serving cell, or a physical cell id (PCI) associated with the first serving cell.

Example 15 comprises the subject matter of any of example(s) 1-14, wherein the time window is based on radio resource control (RRC) signaling associated with the first serving cell.

Example 16 is a user equipment (UE), comprising: a memory interface; and processing circuitry communicatively coupled to the memory interface and configured to: receive a unified transmission configuration indicator (TCI) from a first serving cell wherein the unified TCI is associated with a second serving cell; generate a negative acknowledgment (NACK)/discontinuous transmission (DTX) in response to the unified TCI; maintain configuration for communication with the first serving cell; configure a time window subsequent to generating the NACK/DTX; perform a fallback operation when a dedicated signaling from the first serving cell is not received within the time window.

Example 17 comprises the subject matter of example 16, wherein the fallback operation comprises generating a contention based random access channel preamble (PRACH) associated with the first serving cell.

Example 18 comprises the subject matter of example 17, further configured to, in response to generating the contention based PRACH, generating a message 3 (Msg3) RACH or a message A (MsgA) RACH wherein the Msg3 RACH or MsgA RACH includes a cell radio network temporary identifier (C-RNTI) associated with the first serving cell or a UE ID of the UE.

Example 19 comprises the subject matter of any of example(s) 17-18, further configured to: perform measurements on one or more beams of the second serving cell; and generate a message with at least one of a physical cell ID (PCI), a synchronization signal block (SSB), or channel state information reference signal (CSI-RS) of the second serving cell associated with the measurements on a one or more beams of the second serving cell.

Example 20 comprises the subject matter of any of example(s) 17-18, further configured to perform measurements on one or more beams of a second serving cell and one or more beams of the first serving cell.

Example 21 comprises the subject matter of example 20, further configured to: determine a L1-RSRP of a beam of the first serving cell and a L1-RSRP of a beam of the second serving cell; and generate a message with at least one of a physical cell ID (PCI), a synchronization signal block (SSB), or channel state information reference signal (CSI-RS) of the second serving cell when the L1-RSRP of the second serving cell is higher than the L1-RSRP of the first serving cell.

Example 22 comprises the subject matter of example 16, wherein the fallback operation comprises generating a contention based random access channel preamble (PRACH) for the second serving cell.

Example 23 comprises the subject matter of example 22, further configured to generate a message 3 (Msg3) RACH or a message A (MsgA) RACH wherein the Msg3 RACH or MsgA RACH includes a cell radio network temporary identifier (C-RNTI) associated with a cell of the second serving cell or a UE ID of the UE.

Example 24 comprises the subject matter of example 22, further configured to: perform measurements on a one or more beams of the second serving cell; determine a L1-RSRP of a beam of the second serving cell according to the measurements; determine whether the L1-RSRP of the beam of the second serving cell satisfies a RSRP threshold; and generate a contention based random access channel preamble (PRACH) associated with the second serving cell in response to determining that the RSRP threshold is satisfied by the L1-RSRP of the beam of the second serving cell.

Example 25 comprises the subject matter of example 24, further configured to, when the L1-RSRP of the beam of the second serving cell does not satisfy the RSRP threshold, generate a contention based random access channel preamble (PRACH) associated with first serving cell; or execute one or more of a radio link failure procedure, a beam failure recovery procedure, or a candidate beam detection procedure.

Example 26 is a method, configured with operations comprising: receiving, by a user equipment (UE), a unified transmission configuration indicator (TCI) from a first serving cell wherein the unified TCI is associated with a second serving cell; generating an acknowledgment (ACK) in response to the unified TCI; prior to communicating with the second serving cell, generating an uplink signal for transmission with the second serving cell.

Example 27 comprises the subject matter of example 26, further comprising awaiting a response time period subsequent to transmission of the ACK; and communicating with the second serving cell at an expiration of the response time period.

Example 28 comprises the subject matter of example 26, wherein in response to generating the uplink signal; receiving a downlink confirmation associated with the second serving cell in response to the uplink signal; waiting a response time period subsequent to receiving the downlink confirmation; and communicating with the second serving cell at an expiration of the response time period.

Example 29 comprises the subject matter of any of example(s) 26-28, wherein the uplink signal is associated with a random access channel preamble (PRACH), a sounding reference signal (SRS), a physical uplink control channel (PUCCH), or a physical uplink shared channel (PUSCH).

Example 30 comprises the subject matter of any of example(s) 26-28, wherein the unified TCI is carried by a medium access control (MAC) signaling or a downlink control information (DCI) signaling; and the uplink signal is generated in response to the MAC signaling or the DCI signaling.

Example 31 comprises the subject matter of any of example(s) 26-28, wherein the uplink signal is associated with a contention based random access channel preamble (PRACH), and the operations comprise receiving a response message in at least one of a dedicated search space or control resource set wherein the at least one of the dedicated search space or control resource set are configured by a RRC or a physical downlink control channel (PDCCH) of the second serving cell and based on a radio network temporary identifier (RNTI) of the UE.

Example 32 comprises the subject matter of any of example(s) 26-28, wherein the uplink signal is associated with a physical uplink control channel (PUCCH), and the operations comprise receiving a downlink control information (DCI) from the second serving cell wherein the DCI is based on a cell radio network temporary identifier (C-RNTI) associated with the UE.

Example 33 comprises the subject matter of any of example(s) 26-28, wherein in the uplink signal is associated with a sounding reference signal (SRS), and the operations comprise receiving a response message in at least one of a dedicated search space or control resource set wherein the at least one of the dedicated search space or control resource set are configured by a RRC or a physical downlink control channel (PDCCH) of the second serving cell and based on a radio network temporary identifier (RNTI).

Example 34 comprises the subject matter of any of example(s) 26-28, wherein in the uplink signal is associated with a physical uplink shared channel (PUSCH), and the operations comprise receiving a response message in a physical downlink control channel (PDCCH) associated with the second serving cell, wherein the PDCCH schedules a new transmission with a same hybrid automatic repeat request (HARQ) process as the PUSCH.

Example 35 comprises the subject matter of any of example(s) 26-28, maintaining communication with the first serving cell when the uplink signal fails.

Example 36 is a baseband processor, comprising: processing circuitry configured to: establish a connection with a first serving cell; receive a unified TCI from the first serving cell, wherein the unified TCI is associated with a second serving cell; generate an acknowledgment (ACK) or a negative acknowledgment (NACK)/discontinuous transmission (DTX) in response to the unified TCI; configure an operation to communicate with the second serving cell; and maintain the connection with the first serving cell.

Example 37 comprises the subject matter of example 36, further configured to: configure an operation to communicate with the first serving cell and the second serving cell according to a multi downlink control information (multi-DCI) based inter-cell multi transmission reception point (multi-TRP) operation, wherein a one or more signals from the first serving cell and the second serving cell are multiplexed based on at least one of a time division multiplexing (TDM), a frequency division multiplexing (FDM), or a space division multiplexing (SDM).

Example 38 comprises the subject matter of any of example(s) 36-37, wherein a subcarrier spacing for the first serving cell and the second serving cell are in a same bandwidth part (BWP).

Example 39 comprises the subject matter of any of example(s) 36-37, wherein a first bandwidth part (BWP) associated with the first serving cell is different than a second BWP associated with the second serving cell.

Example 40 comprises the subject matter of any of example(s) 36-37, further configured to: monitor for a signal from the first serving cell during a time window subsequent to transmission of the ACK or NACK/DTX; and cancel configuration of the operation to communicate with the second serving cell in response to detecting a signal from the first serving cell during the time window.

Example 41 comprises the subject matter of any of example(s) 36-37, wherein in response to generating the ACK or NACK/DTX, further configured to: configure a time window subsequent to transmission of the ACK or NACK/DTX; and cancel configuration of the operation to communicate with the second serving cell when a dedicated signaling from the second serving cell is not received within the time window.

Example 42 comprises the subject matter of any of example(s) 36-37, further configured to: monitor for a signal from the second serving cell during a time window subsequent to transmission of the ACK or NACK/DTX; and cancel configuration of the operation to communicate with the first serving cell in response to detecting a signal from the second serving cell during the time window.

Example 43 is a serving cell, configured to: transmit a unified transmission configuration indicator TCI associated with a second serving cell to a user equipment (UE); receive an ACK from the UE; receive a signal indicating a serving cell mismatch from the UE; and re-establishing communication with the UE in response to the signal.

Example 44 comprises the subject matter of example 43, further configure to receive a cell radio network temporary identifier (C-RNTI) associated with the serving cell or the UE.

A user equipment configured to perform any action or combination of actions as substantially described herein, comprised in exampled 1-44, and in the Detailed Description as included in the user equipment.

A network node configured to perform any action or combination of actions as substantially described herein, comprised in exampled 1-44, and in the Detailed Description as included in the network node.

A non-volatile computer-readable medium that stores instructions that, when executed, cause the performance of any action or combination of actions as substantially described herein, comprised in exampled 1-44, and in the Detailed Description.

Moreover, various aspects or features described herein can be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data. Additionally, a computer program product can include a computer readable medium having one or more instructions or codes operable to cause a computer to perform functions described herein.

Communication media embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

An exemplary storage medium can be coupled to processor, such that processor can read information from, and write information to, storage medium. In the alternative, storage medium can be integral to processor. Further, in some aspects, processor and storage medium can reside in an ASIC. Additionally, ASIC can reside in a user terminal or apparatus.

In this regard, while the disclosed subject matter has been described in connection with various aspects and corresponding Figures, where applicable, it is to be understood that other similar aspects can be used or modifications and additions can be made to the described aspects for performing the same, similar, alternative, or substitute function of the disclosed subject matter without deviating therefrom. Therefore, the disclosed subject matter should not be limited to any single aspect described herein, but rather should be construed in breadth and scope in accordance with the appended claims below.

In particular regard to the various functions performed by the above described components (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the disclosure. In addition, while a particular feature can have been disclosed with respect to only one of several implementations, such feature can be combined with one or more other features of the other implementations as can be desired and advantageous for any given or particular application.

The present disclosure is described with reference to the attached drawing figures, wherein like reference numerals are used to refer to like elements throughout, and wherein the illustrated structures and devices are not necessarily drawn to scale. As utilized herein, terms "component," "system," "interface," and the like are intended to refer to a computer-related entity, hardware, software (e.g., in execution), and/or firmware. For example, a component can be a processor (e.g., a microprocessor, a controller, or other processing device), a process running on a processor, a controller, an object, an executable, a program, a storage device, a computer, a tablet PC and/or a user equipment (e.g., mobile phone, etc.) with a processing device. By way of illustration, an application running on a server and the server can also be a component. One or more components can reside within a process, and a component can be localized on one computer and/or distributed between two or more computers. A set of elements or a set of other components can be described herein, in which the term "set" can be interpreted as "one or more."

Further, these components can execute from various computer readable storage media having various data structures stored thereon such as with a module, for example. The components can communicate via local and/or remote processes such as in accordance with a signal having one or more data packets (e.g., data from one component interacting with another component in a local system, distributed system, and/or across a network, such as, the Internet, a local area network, a wide area network, or similar network with other systems via the signal).

As another example, a component can be an apparatus with specific functionality provided by mechanical parts operated by electric or electronic circuitry, in which the electric or electronic circuitry can be operated by a software application or a firmware application executed by one or more processors. The one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components.

Use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form. Furthermore, to the extent that the terms "including", "includes", "having", "has", "with", or variants thereof are used in either the detailed description and the claims, such terms are intended to be inclusive in a manner similar to the term "comprising." Additionally, in situations wherein one or more numbered items are discussed (e.g., a "first X", a "second X", etc.), in general the one or more numbered items can be distinct or they can be the same, although in some situations the context can indicate that they are distinct or that they are the same.

As used herein, the term "circuitry" can refer to, be part of, or include an Application Specific Integrated Circuit (ASIC), an electronic circuit, a processor (shared, dedicated, or group), or associated memory (shared, dedicated, or group) operably coupled to the circuitry that execute one or more software or firmware programs, a combinational logic circuit, or other suitable hardware components that provide the described functionality. In some aspects, the circuitry can be implemented in, or functions associated with the circuitry can be implemented by, one or more software or firmware modules. In some aspects, circuitry can include logic, at least partially operable in hardware.

What is claimed is:

1. A baseband processor configured to:

receive a unified transmission configuration indicator (TCI) from a first serving cell wherein the unified TCI includes a mapping between a TCI state and a second serving cell that is a candidate cell of a user equipment (UE) of the baseband processor and is not activated at a time of reception, wherein the mapping identifies beam information of the second serving cell;

in response to receiving the unified TCI, output, for transmission, an acknowledgment (ACK) message to the first serving cell;

communicate with the second serving cell based on the indicated beam information of the unified TCI; and configure a time window subsequent to transmission of the ACK message;

perform a fallback operation when a dedicated signaling from the second serving cell is not received within the time window, wherein the fallback operation comprises generating a scheduling request (SR) associated with the second serving cell; and generating the SR based on a physical uplink control channel (PUCCH) resource of the second serving cell that is identified by the mapping between the TCI state and the second serving cell, the PUCCH resource being configured by a radio resource control (RRC) signaling from the first serving cell.

2. The baseband processor of claim 1, wherein the fallback operation comprises configuring operations to communicate with the first serving cell.

3. The baseband processor of claim 1, wherein the fallback operation comprises generating a contention based random access channel preamble (PRACH) associated with the second serving cell.

4. The baseband processor of claim 3, further configured to generate a medium access control (MAC) control element (CE) associated with Layer 1 (L1)/Layer 2 (L2)-centric inter-cell mobility communications in a message 3 (Msg3) RACH or a message A (MsgA) RACH, wherein the MAC CE includes a cell radio network temporary identifier (C-RNTI) of the second serving cell or a TCI to cell mapping used for selecting a PRACH resource for the second serving cell prior to receiving dedicated signaling from the second serving cell that configures the UE to communicate with the second serving cell.

5. The baseband processor of claim 1, wherein the fallback operation comprises generating a contention free random access channel preamble (PRACH) associated with the second serving cell, wherein the contention free PRACH is based on a radio resource control (RRC) signaling associated with the first serving cell.

6. The baseband processor of claim 5, further configured to receive a response message in at least one of a dedicated search space or control resource set wherein the at least one of the dedicated search space or control resource set is configured by the RRC signaling or a physical downlink control channel (PDCCH) of the second serving cell and based on a radio network temporary identifier (RNTI) of a user equipment (UE) associated with the baseband processor, wherein the response message is initiated by the contention free PRACH.

7. A user equipment (UE), comprising:
- a memory interface; and
- processing circuitry communicatively coupled to the memory interface and configured to:
  - receive a unified transmission configuration indicator (TCI) from a first serving cell wherein the unified TCI includes a mapping between a TCI state and a second serving cell that is a candidate cell of the UE and is not activated at a time of reception, wherein the mapping identifies beam information of the second serving cell;
  - transmit, by a radio frequency circuitry, a negative acknowledgment (NACK)/discontinuous transmission (DTX) in response to the unified TCI;
  - maintain configuration for communication with the first serving cell;
  - configure a time window subsequent to generating the NACK/DTX;
  - perform a fallback operation when a dedicated signaling from the first serving cell is not received within the time window, wherein the fallback operation comprises generating a scheduling request (SR) associated with the second serving cell; and
  - generating the SR based on a physical uplink control channel (PUCCH) resource of the second serving cell that is identified by the mapping between the TCI state and the second serving cell, the PUCCH resource being configured by a radio resource control (RRC) signaling from the first serving cell.

8. The UE of claim 7, wherein the fallback operation comprises generating a contention based random access channel preamble (PRACH) associated with the first serving cell.

9. The UE of claim 8, further configured to, in response to generating the contention based PRACH, generate a message 3 (Msg3) RACH or a message A (MsgA) RACH wherein the Msg3 RACH or MsgA RACH includes a cell radio network temporary identifier (C-RNTI) associated with the first serving cell or a UE ID of the UE.

10. The UE of claim 8, further configured to:
- perform measurements on one or more beams of the second serving cell, wherein beam information of the one or more beams of the second serving cell is indicated by the unified TCI; and
- generate a message with at least one of a physical cell ID (PCI), a synchronization signal block (SSB), or channel state information reference signal (CSI-RS) of the second serving cell associated with the measurements on one or more beams of the second serving cell.

11. The UE of claim 7, wherein the fallback operation comprises generating a contention based random access channel preamble (PRACH) for the second serving cell.

12. The UE of claim 11, further configured to generate a message 3 (Msg3) RACH or a message A (MsgA) RACH wherein the Msg3 RACH or MsgA RACH includes a cell radio network temporary identifier (C-RNTI) associated with a cell of the second serving cell or a UE ID of the UE.

13. The UE of claim 11, further configured to:
- perform measurements on one or more beams of the second serving cell;
- determine a L1-RSRP of a beam of the second serving cell according to the measurements;
- determine whether the L1-RSRP of the beam of the second serving cell satisfies a RSRP threshold; and
- generate a contention based random access channel preamble (PRACH) associated with the second serving cell in response to determining that the RSRP threshold is satisfied by the L1-RSRP of the beam of the second serving cell.

14. A method for a user equipment (UE), configured with operations comprising:
- receiving a unified transmission configuration indicator (TCI) from a first serving cell wherein the unified TCI includes a mapping between a TCI state and a second serving cell that is a candidate cell of the UE and is not activated at a time of reception, wherein the mapping identifies beam information of the second serving cell;
- in response to receiving the unified TCI,
- transmitting an acknowledgment (ACK) message to the first serving cell;
- communicating with the second serving cell based on the indicated beam information of the unified TCI;
- configuring a time window subsequent to transmission of the ACK message;
- performing a fallback operation when a dedicated signaling from the second serving cell is not received within the time window, wherein the fallback operation comprises generating a scheduling request (SR) associated with the second serving cell; and
- generating the SR based on a physical uplink control channel (PUCCH) resource of the second serving cell that is identified by the mapping between the TCI state and the second serving cell, the PUCCH resource being configured by a radio resource control (RRC) signaling from the first serving cell.

15. The method of claim 14, further comprising awaiting a response time period subsequent to transmission of the ACK; and
- communicating with the second serving cell at an expiration of the response time period.

16. The method of claim 14, further comprising:

prior to communicating with the second serving cell, generating an uplink signal for transmission with the second serving cell;

receiving a downlink confirmation associated with the second serving cell in response to generating the uplink signal;

waiting a response time period subsequent to receiving the downlink confirmation; and communicating with the second serving cell at an expiration of the response time period.

17. The method of claim 14, wherein the uplink signal is associated with a sounding reference signal (SRS), and the operations comprise:

receiving a response message in at least one of a dedicated search space or control resource set wherein the at least one of the dedicated search space or control resource set is configured by a RRC or a physical downlink control channel (PDCCH) of the second serving cell and based on a radio network temporary identifier (RNTI).

18. The method of claim 14, wherein the uplink signal is associated with a physical uplink shared channel (PUSCH), and the operations comprise:

receiving a response message in a physical downlink control channel (PDCCH) associated with the second serving cell, wherein the PDCCH schedules a new transmission with a same hybrid automatic repeat request (HARQ) process as the PUSCH.

19. The baseband processor of claim 1, further configured to:

perform measurements on one or more beams of the second serving cell, wherein beam information of the one or more beams of the second serving cell are indicated by the unified TCI; and generate a message with at least one of a physical cell ID (PCI), a synchronization signal block (SSB), or channel state information reference signal (CSI-RS) of the second serving cell associated with the measurements on one or more beams of the second serving cell.

20. The UE of claim 11, further configured to:

perform measurements on one or more beams of the second serving cell;

determine a L1-RSRP of a beam of the second serving cell according to the measurements;

determine whether the L1-RSRP of the beam of the second serving cell satisfies a RSRP threshold; and generate a contention based random access channel preamble (PRACH) associated with the second serving cell in response to determining that the RSRP threshold is satisfied.

* * * * *